(12) United States Patent
Xu et al.

(10) Patent No.: US 10,040,674 B2
(45) Date of Patent: Aug. 7, 2018

(54) CART WITH HEIGHT ADJUSTABLE PLATFORM AND METHODS OF USING THE SAME

(71) Applicant: BIG LIFT, LLC., Lombard, IL (US)

(72) Inventors: Linjie Xu, Hangzhou (CN); Zuqian Lin, Hangzhou (CN); Qichen Ma, Hangzhou (CN); Jin Hui He, Hangzhou (CN)

(73) Assignee: BIG LIFT, LLC, Lombard, IL (US)

( * ) Notice: Subject to any disclaimer, the term of this patent is extended or adjusted under 35 U.S.C. 154(b) by 333 days.

(21) Appl. No.: 14/557,050

(22) Filed: Dec. 1, 2014

(65) Prior Publication Data

US 2015/0166314 A1    Jun. 18, 2015

Related U.S. Application Data

(60) Provisional application No. 61/916,907, filed on Dec. 17, 2013.

(51) Int. Cl.
| | |
|---|---|
| *B66F 9/065* | (2006.01) |
| *B62B 3/06* | (2006.01) |
| *B65D 19/00* | (2006.01) |
| *B66F 7/06* | (2006.01) |
| *B66F 7/08* | (2006.01) |

(52) U.S. Cl.
CPC ............ *B66F 9/065* (2013.01); *B62B 3/0618* (2013.01); *B62B 3/0625* (2013.01); *B62B 3/0643* (2013.01); *B65D 19/0018* (2013.01); *B66F 7/0658* (2013.01); *B66F 7/08* (2013.01); *B65D 2519/00034* (2013.01); *B65D 2519/00069* (2013.01); *B65D 2519/0094* (2013.01); *B65D 2519/00268* (2013.01); *B65D 2519/00288* (2013.01); *B65D 2519/00318* (2013.01); *B65D 2519/00338* (2013.01); *B65D 2519/00407* (2013.01)

(58) Field of Classification Search
CPC ........................................................ B65F 9/00
See application file for complete search history.

(56) References Cited

U.S. PATENT DOCUMENTS

| | | | |
|---|---|---|---|
| 3,648,869 A | 3/1972 | Christianson et al. | |
| 4,077,535 A | 3/1978 | Oriol | |
| 4,511,110 A | 4/1985 | Moller | |
| 5,586,620 A * | 12/1996 | Dammeyer | B66F 9/0755 187/227 |
| 5,752,584 A | 5/1998 | Magoto et al. | |
| 8,282,111 B2 | 10/2012 | Hailston et al. | |
| 2007/0210542 A1 | 9/2007 | Hammond | |
| 2010/0096820 A1* | 4/2010 | Hailston | B62B 3/0618 280/47.11 |

* cited by examiner

*Primary Examiner* — Saul Rodriguez
*Assistant Examiner* — Willie Berry, Jr.
(74) *Attorney, Agent, or Firm* — Cook Alex Ltd.

(57) ABSTRACT

Carts for use with pallets and methods of using the same are disclosed. The carts have an adjustable height platform that includes a base, a plurality of wheels rotatably coupled to the base, a platform, a linkage assembly coupled to and disposed between the base and the platform, a lift mechanism coupled to and disposed between the base and the platform, an upwardly extending handle, and wherein the platform is movable between a first position and a second position that is above the first position. The carts may include drive motors and the pallets may be nestably stackable.

22 Claims, 24 Drawing Sheets

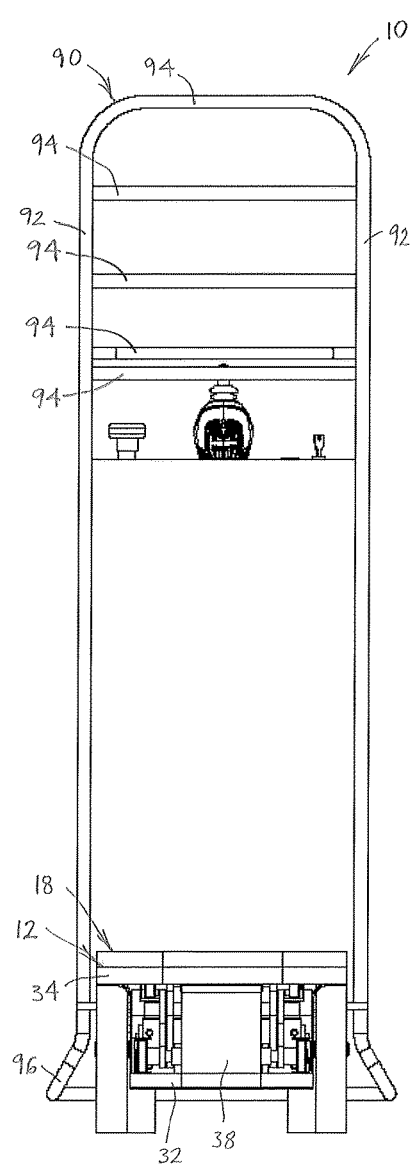
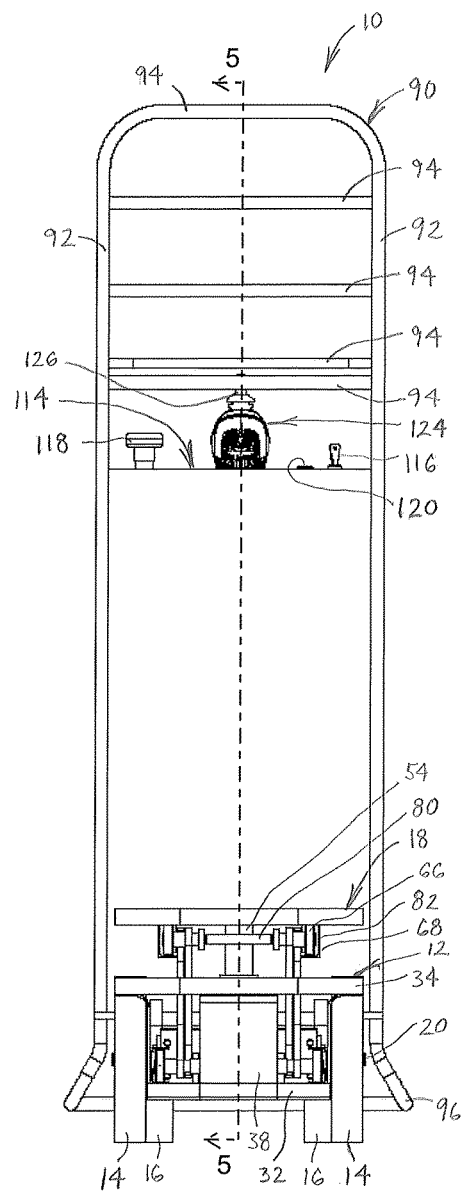
FIG. 3
FIG. 4

CART WITH HEIGHT ADJUSTABLE PLATFORM AND METHODS OF USING THE SAME

CROSS-REFERENCE TO RELATED APPLICATION

This application claims the benefit of U.S. Provisional Patent Application Ser. No. 61/916,907, filed Dec. 17, 2013, the disclosure of which is hereby incorporated by reference in its entirety.

FIELD OF THE DISCLOSURE

The present disclosure relates generally to carts for moving goods, and more particularly, to carts having a height adjustable platform that is operable to lift and lower a pallet to be transported on the cart, to the pallets used with the carts, and to methods of using the carts and pallets.

BACKGROUND

Modes of movement, transport and delivery of goods are changing, as can be seen for instance with respect to canned or bottled beverages. It has been common for many years to lift individual cases of beverage cans or bottles and to move them on a two-wheeled dolly or hand truck. This would be carried out by a delivery person who would manually reach into a truck, and repeatedly lift and stack several cases on a hand truck. The delivery person then would tilt the hand truck and roll it by pushing or pulling the hand truck to move the goods into a retail establishment, where they would be unloaded by lifting the cases from the hand truck and stacking them on a floor surface or shelves. This is a very labor intensive and highly repetitive job, due to the size of the packages that must be moved by the individual when lifting, and when trying to transport them on the hand truck. This method of moving goods also can put the operator and goods at risk of injury due to the bending, lifting, pushing and pulling. Also, when on the hand truck, the heavy, tall and slender load can become unstable, hard to control and possibly fall to the ground, or onto the delivery person or other persons or objects nearby.

In more recent years, merchandising and delivery of goods has ushered in new ways of moving and displaying goods. For instance, several individual items, such as cases of canned or bottled beverages, may be loaded onto a pallet of reduced size that can be used for delivering and storing or displaying the goods in a retail establishment. The reduced size pallets may range in width from approximately 15-24 inches, in length from approximately 36-48 inches, and in height from approximately 6-15 inches. The use of such relatively narrow pallets permits passage through conventional doorways while carrying a much larger quantity of goods in a given trip between a delivery vehicle and a final destination. The pallets may be of various lengths and can be loaded at manufacturing facilities or distribution centers, to reduce or avoid having the delivery person do any lifting of individual items. Moreover, a variety of goods may be combined to create custom palletized orders, while the pallets may be moved by more conventional forklifts or pallet trucks when moving about manufacturing and distribution facilities and when loading a delivery vehicle. Such pallets may be individually lifted by a cart that can be pushed or pulled by a delivery person to transport the goods from a delivery vehicle to a final destination. This results in a great increase in the amount of product that an individual delivery person can move, in a safer manner, thereby also reducing the frequency or number of cycles traversed between the vehicle and the final location for the goods within each delivery visit. The reduced size of the pallet also allows the pallets to be moved lengthwise through doorways and to be used as noted above in merchandising displays without having to unload the pallet and stock the goods on individual shelves.

This disclosure sets forth several alternative apparatus and methods of using the same that overcome shortcomings in the prior art.

SUMMARY

Disclosed herein are advantageous apparatus including example carts having a height adjustable platform for use with existing pallets or reduced size or with pallets that may incorporate further improvements including nestably stackable features, as well as methods of using the same. The carts provide a height adjustable platform and may include an electrical drive system, thereby permitting propulsion and reducing the stress and strain encountered by a delivery person or operator of the cart. The improved example carts help to overcome disadvantages seen in the use of traditional hand trucks and existing carts having a lift, while avoiding the inherent drawbacks associated with moving to larger equipment and pallets that will not pass through doorways and aisles of retail establishments. The nestably stackable pallets also increase efficiency by reducing the volume associated with moving, stocking and shipping stacked empty pallets. Moreover the ease and efficiency of using the apparatus disclosed herein may significantly increase the use of such smaller palletized shipments, and may encourage and facilitate use with additional types of goods.

In a first aspect, the disclosure provides a cart having an adjustable height platform that includes a base, a plurality of wheels rotatably coupled to the base, a platform, a linkage assembly including at least two laterally spaced pairs of scissor arms coupled to and disposed between the base and the platform, a lift mechanism coupled to and disposed between the base and the platform, an upwardly extending handle, and wherein the platform is movable between a first position and a second position that is above the first position.

In another aspect, the disclosure provides a cart having an adjustable height platform and a drive system that includes a base, a plurality of wheels rotatably coupled to the base, at least one of the plurality of wheels being coupled to a drive motor, a drive controller being electrically coupled to the drive motor, a platform, a linkage assembly coupled to and disposed between the base and the platform, a lift mechanism coupled to and disposed between the base and the platform, an upwardly extending handle, and wherein the platform is movable between a first position and a second position that is above the first position.

In yet another aspect, the disclosure provides a method of using a cart to move a pallet from a floor surface of a truck having a rear lift to a floor surface in an interior of a building. The method includes the steps of providing a cart having an adjustable height platform and a drive system including a base, a plurality of wheels rotatably coupled to the base, at least two of the plurality of wheels being coupled to two separate drive motors respectively, a drive controller being electrically coupled to the drive motors, a platform, a linkage assembly coupled to and disposed between the base and the platform, a lift mechanism coupled to and disposed between the base and the platform, a lift controller coupled to the lift mechanism, an upwardly extending handle, and the platform being movable between a first position and a second position that is above the first position. The method further includes actuating the drive controller wherein the drive motors move the cart to a location within a truck having a lift and having a pallet resting on a floor surface of the truck wherein the platform is in the first position and is disposed between the pallet and the floor surface of the truck. The method includes actuating the lift controller wherein the lift mechanism moves the platform to the second position and suspends the pallet in a lifted position above the floor surface of the truck, actuating the drive controller wherein the drive motors move the cart to a location on the rear lift of the truck, lowering the rear lift of the truck to a ground level, actuating the drive controller wherein the drive motors move the cart to a location within the interior of a building, and actuating the lift controller wherein the lift mechanism moves the platform to the first position wherein the pallet is resting on a floor surface in the interior of the building.

In a further aspect, the disclosure provides a pallet for being transported on a cart having a platform that is configured to lift the pallet. The pallet includes a molded plastic body, with the molded plastic body including a deck having an upper surface on which goods may be placed and a lower surface configured to be engaged by a platform of a cart that may be raised to lift the pallet. The pallet also includes a plurality of legs extending downwardly from the deck, with the plurality of legs being spaced apart longitudinally and laterally in a configuration that permits insertion of a fork of a forklift between the longitudinally spaced apart legs and that permits insertion of a platform of a cart or a forklift between the laterally spaced apart legs, and the plurality of legs further being configured to be nestably stackable with legs of a first pallet being recessed within the legs of a like second pallet when the first pallet is stacked atop the second pallet.

Thus, the present disclosure presents alternatives to prior art cart and pallet apparatus and provides advantageous features in more conveniently and efficiently utilized cart and pallet systems. It is to be understood that both the foregoing general description and the following detailed description are exemplary and provided for purposes of explanation only, and are not restrictive with respect to the claimed subject matter. Further features and advantages will become more fully apparent in the following description of the example preferred embodiments and from the appended claims.

BRIEF DESCRIPTION OF THE DRAWINGS

In describing the preferred examples, reference is made to the accompanying drawing figures wherein like parts have like reference numerals, and wherein:

FIG. 3 is a front plan view of the cart of FIG. 1, with the platform in the first position;

FIG. 4 is a front plan view of the cart of FIG. 1, with the platform in the second position and including a section line 5-5 relating to the cross-sectional view shown in FIG. 5;

Figure 1:
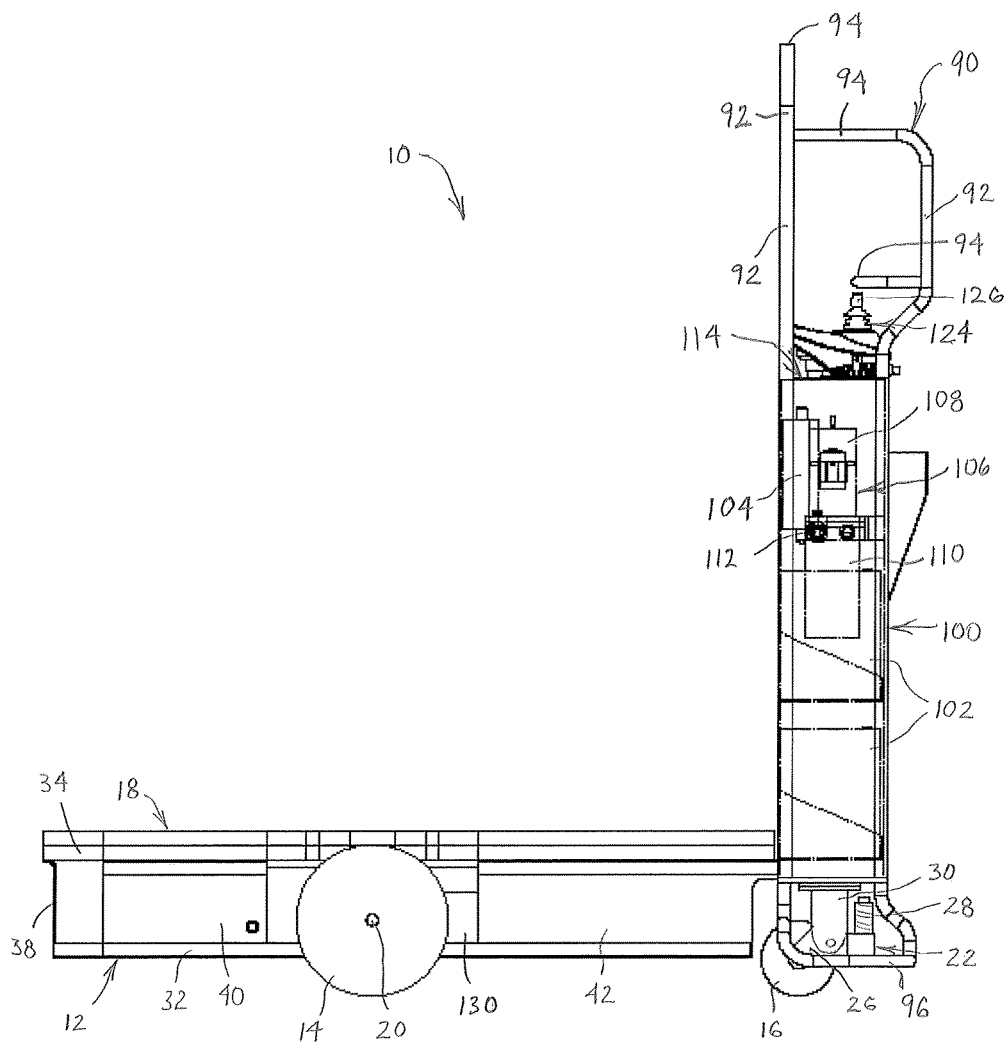
FIG. 1 is a side plan view of a first example cart having a height adjustable platform in a first position and a drive system for moving the cart across a ground surface.
Figure 2:
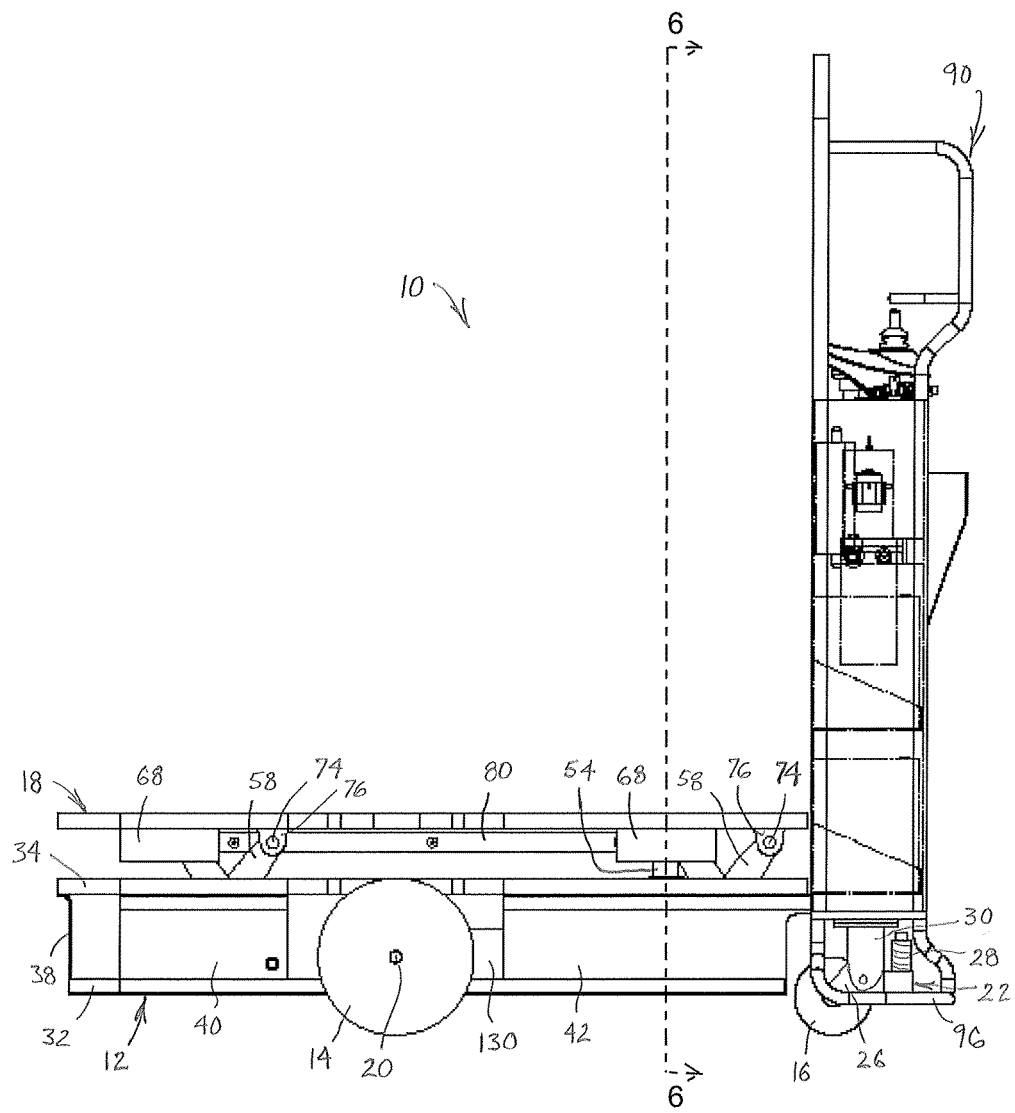
FIG. 2 is a side plan view of the cart of FIG. 1, with the platform in a second position and including a section line 6-6 relating to the cross-sectional view shown in FIG. 6.

It should be understood that the drawings are not to necessarily to scale. While some mechanical details of carts and pallets, including some details of fastening or connecting means and other plan and section views of the particular components, have been omitted, such details are considered within the comprehension of those skilled in the art in light of the present disclosure. It also should be understood that the present disclosure is not limited to the examples illustrated.

DETAILED DESCRIPTION

This disclosure presents examples of apparatus and methods of using the same, which may be embodied in several forms. For instance, within FIGS. 1-34 are shown example carts and pallets, as will be described further herein with reference to the accompanying drawings of the preferred embodiments. It will be appreciated, however, that the invention may be constructed and configured in various ways and is not limited to the examples in the form of the preferred embodiments shown and described herein.

A first example embodiment of a cart having an adjustable height platform is illustrated in FIGS. 1-15, with the cart being suited to lift and transport pallets, such as the example pallets shown in FIGS. 13-17. The cart 10 includes a base 12 having a plurality of wheels 14, 16 rotatably coupled to the base 12, and a platform 18 that is movable between a first position and a second position that is above the first position.

Prior art carts for carrying reduced size pallets generally of the type discussed herein have taught the use of pairs of front and rear caster wheels with an additional pair of larger diameter middle wheels located therebetween to facilitate rocking the cart when moving over obstacles on a ground surface. The present example cart 10 includes a pair of forward wheels 14 rotatably coupled to the base 12 by being rotatably connected to axles 20 that are mounted to the base 12, wherein the axles 20 extend perpendicularly to a longitudinal axis L (seen in FIG. 12) of the base 12. A pair of rearward wheels 16 is rotatably coupled to the base 12 on caster assemblies 22. The rearward wheels 16 are mounted on axles 24 that are connected to axle brackets 26 of the caster assemblies 22 that swivel about a vertical axis V (seen in FIG. 5). The caster assemblies 22 also may include a resilient element 28, such as one or more springs operably configured to provide a suspension between caster brackets 30 that pivot about the vertical axis V while also being pivotably connected at their lower end to axle brackets 26. In this example, each caster assembly 22 includes two resilient elements 28, as may be seen in FIG. 8, for increased load capacity.

The use of four wheels 14, 16, with the forward wheels 14 positioned lengthwise forward of the center of the platform 18, and the rearward wheels positioned beneath the rear of the cart, reduces the tendency of the cart to tip forwardly, and therefore, the need to have an additional pair of wheels at the front of the base 12. In turn, this advantageously may be used to reduce costs, complexity and weight. The ability to keep the wheels 14, 16 of the cart 10 in contact with the surface over which the cart 10 is traveling also provides an improved, more secure feeling for the operator, as opposed to the disconcerting feeling of allowing a cart to rock somewhat uncontrollably fore and aft when traversing obstacles, such as thresholds of doorways. It will be appreciated that the cart 10 could be constructed with an additional single caster wheel or pair of caster wheels proximate the front of the base, if desired. It also will be understood that the configuration of the wheels used on the cart 10 could include wheels of any relative size that provide sufficient load capacity. Indeed, the term "wheels", as used throughout the description of the example embodiments, should be understood to mean wheels and/or tires, or those structures that are rotatably connected to the base and contact the surface on which the cart rests or rolls. It further will be appreciated that the configuration of wheels alternatively could be reversed, so as to place a pair of caster wheels forward of a pair of wheels on axles that extend perpendicularly to the longitudinal axis L, which would have the non-caster wheels located behind the center of the platform 18 and toward the rear of the cart.

The base 12 essentially provides a chassis of the cart 10. In this example, the base 12 is configured to include a lower frame 32 that extends lengthwise between the forward wheels 14, and an upper frame 34 that includes inward deviations 36 in the area of the forward wheels 14 that facilitate having the forward wheels 14 generally remain within the overall width profile of the upper frame 34, as may be seen in FIG. 11 with the platform 18 removed for convenience of viewing components within the base, and in FIG. 12 with the platform 18 being located directly above the upper frame 34. Structural members, such as plates and tubing portions may be used to construct the platform 18, the upper frame 34 and the lower frame 32, as well as to connect the upper and lower frames 32, 34. In this example sections of tubing, such as steel square tubing or the like, are used throughout the platform 18, and the upper and lower frames 32, 34, along with plates, such as steel plate or the like. Such plates and tubing may be joined in any suitable manner, such as by use of welding or fasteners. For instance, a front plate 38 and side plates 40, 42, extend upward from the perimeter of the lower frame 32 and support the upper frame 34. Use of plates may additionally provide protective guards for components located within the base 12, while they also may provide broad structural support, such as can be appreciated with the generally horizontal plate 44 within the platform 18 that serves to transmit lifting loads to the platform over an extended surface area. It also will be appreciated that the platform 18, lower frame 32 and upper frame 34 could be formed in other ways and of other materials, such as formed sheet metal, molded plastics or other substantially rigid materials, and the top surface of the platform 18 may be completely closed, as may the bottom surface of the lower frame 32 and the upper surface of the upper frame 34, except as needed to permit movement of the lift mechanism 54 and connection of the platform 18 to the base 12.

Figure 5:
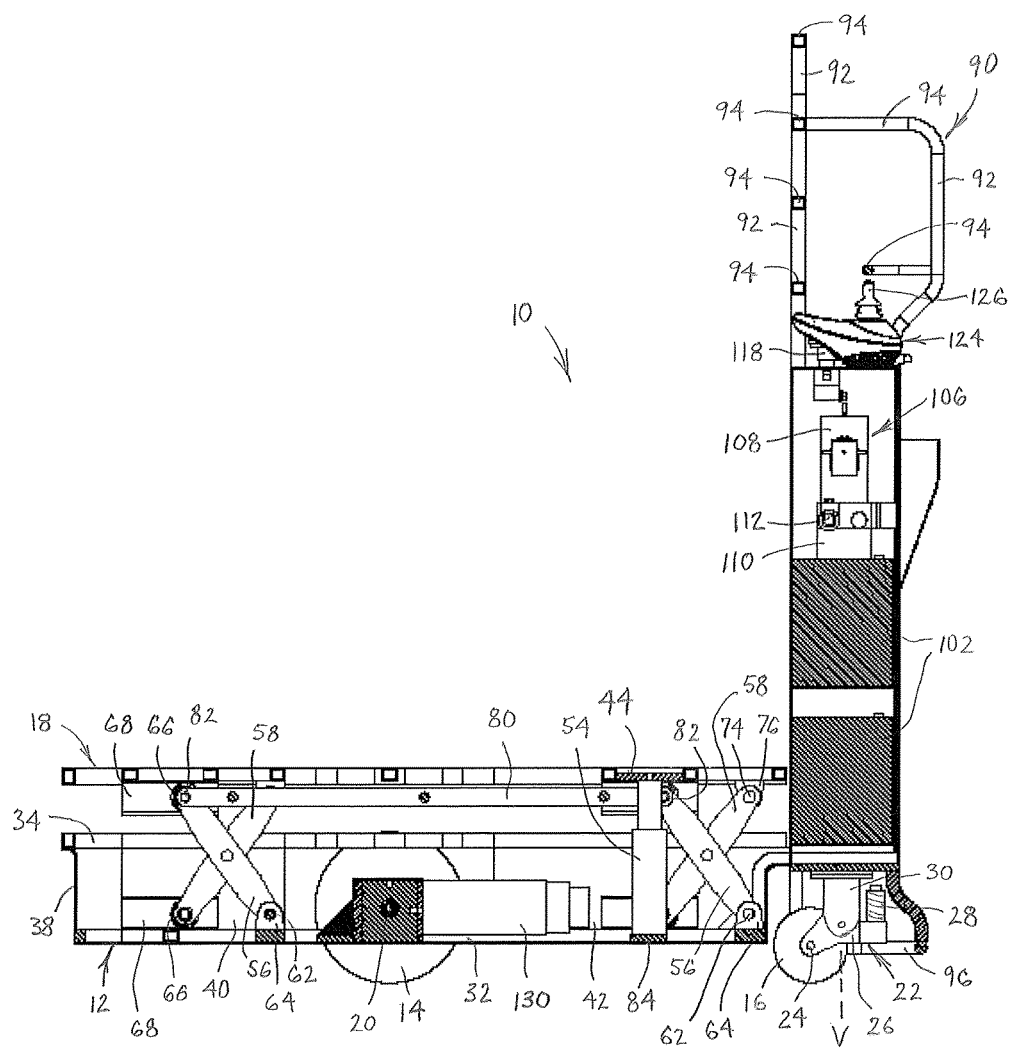
FIG. 5 is a cross-sectional side view of the cart of FIG. 1 taken through the section line 5-5 in FIG. 4, with the platform in a second position.
Figure 6:
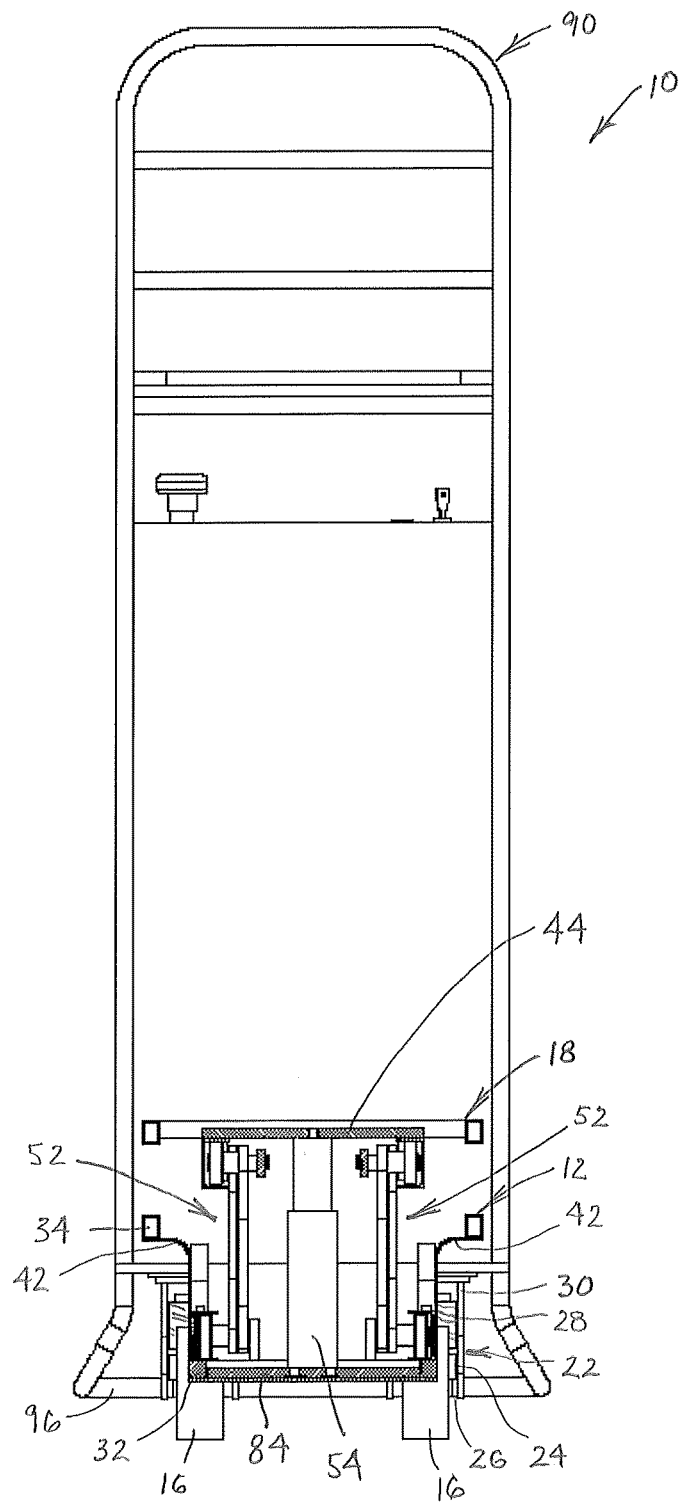
FIG. 6 is a cross-sectional front view of the cart of FIG. 1 taken through the section line 6-6 in FIG. 2, with the platform in a second position.
Figure 7:
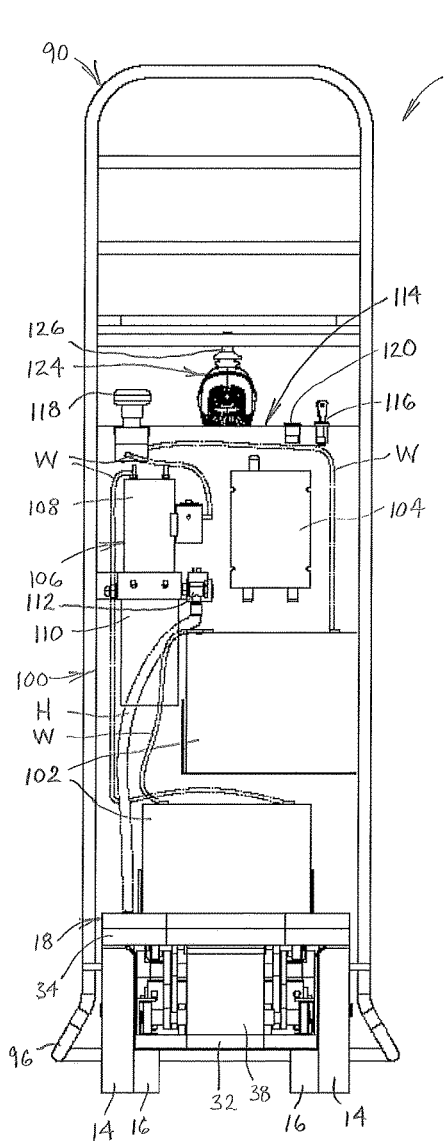
FIG. 7 is a front plan view of the cart of FIG. 1, with the platform in the first position and providing a view of the components located within the upright housing as if the front wall of the housing were removed.
Figure 8:
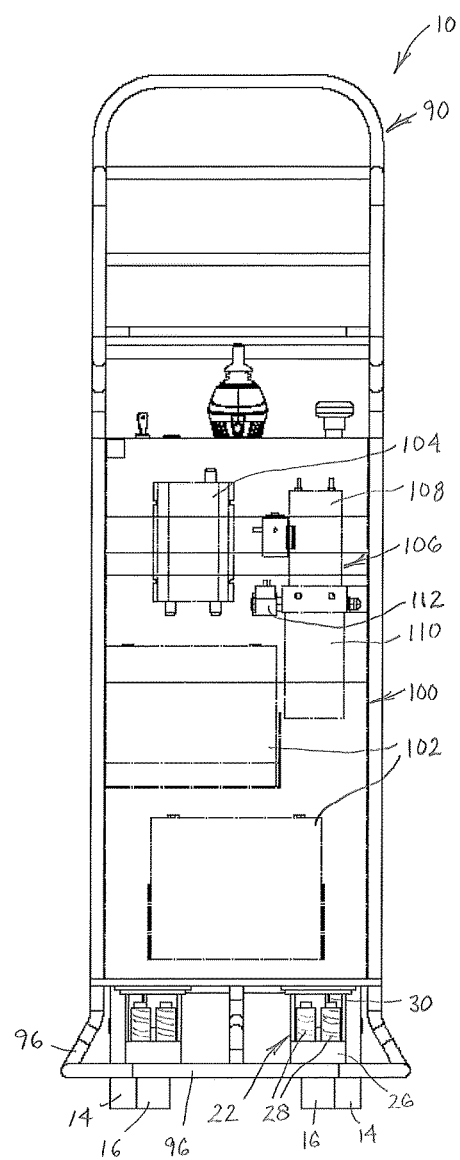
FIG. 8 is a rear plan view of the cart of FIG. 1, providing a view of the components located within the upright housing as if the rear cover of the housing were removed.
Figure 9:
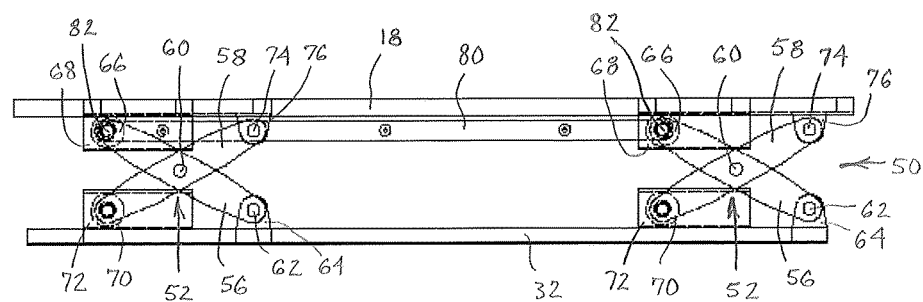
FIG. 9 is a simplified side view of the height adjustable platform and the base of the cart of FIG. 1 and the scissor structures that extend therebetween.
Figure 10:
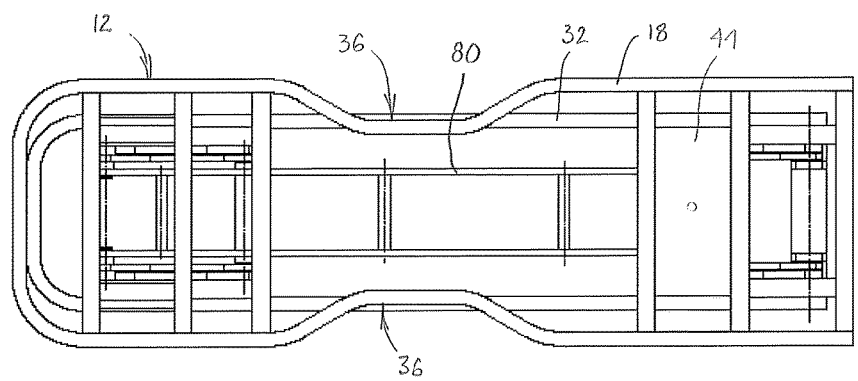
FIG. 10 is a top plan view of the height adjustable platform, the base and the scissor structures of the cart of FIG. 1.
Figure 11:
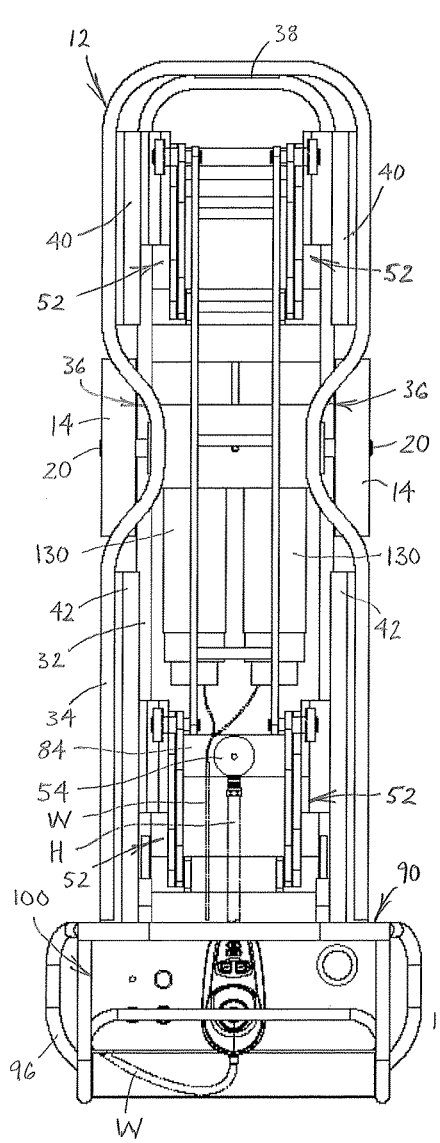
FIG. 11 is a top plan view of the cart of FIG. 1, having the height adjustable platform removed to provide a better view of the components that are connected to and extend upward from the base.
Figure 12:
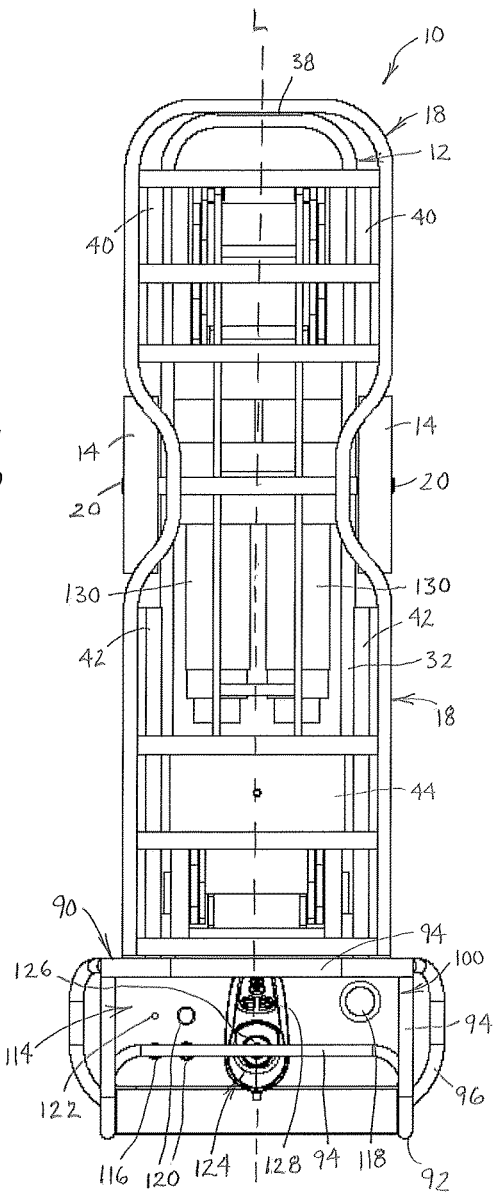
FIG. 12 is a top plan view of the cart of FIG. 1, with the platform in the second position.

As may be best appreciated in FIGS. 5, 6 and 9, a linkage assembly 50, including at least two laterally spaced pairs of scissor arms 52, are coupled to and disposed between the base 12 and the platform 18, and a lift mechanism 54 is coupled to and disposed between the base 12 and the platform 18. Each pair of scissor arms 52 includes left and right first and second arms 56, 58, with each arm being connected to both the lower frame 32 and the upper frame 34, while being connected to each other at a pivot 60 along their respective mid-sections. First ends of the first arms 56 are pivotally connected to the lower frame 32 at fixed pivots 62 on flanges 64 that are fixed to the lower frame 32 of the base 12, and second ends of the first arms 56 are connected slidably to the platform 18 at roller bearings 66 in channels 68 that are fixed to the platform 18. To complete the pairs of scissor arms 52, first ends of the second arms 58 are connected slidably to the lower frame 32 at roller bearings 70 in channels 72 that are fixed to the lower frame 32, and second ends of the second arms 58 are pivotally connected to the platform 18 at fixed pivots 74 on flanges 76 that are fixed to the platform 18.

In this example, a synchronizing strut 80 having a ladder type structure is pivotally connected at its ends to the second ends of the first arms 56, such as at posts 82 that also support the roller bearings 66. Unlike the prior art devices, the two laterally spaced pairs of scissor arms 52 and synchronizing strut 80 of the linkage assembly 50 provide a stable connection between the base 12 and the platform 18. This linkage assembly 50 is inherently stable in the sense that it maintains the platform 18 parallel to and directly above the base 12 without a tendency of the platform 18 to shift or sway forward, rearward, to the left or to the right, whether in a first position in contact with or close to the upper frame 34, as shown in FIGS. 1, 3, 7, 9, 12 and 13, or in a second position that is above the first position, as shown in FIGS. 2, 4-6 and 14. As such, the lift mechanism 54 may be located at a single location between the base 12 and platform 18.

For instance, the lift mechanism 54 of the present example is shown as a single hydraulic cylinder having the lower end of its cylinder connected to a cross plate 84 on the base 12 and having the upper end of its piston connected to the generally horizontal plate 44 within the platform 18. It will be appreciated that the single hydraulic cylinder provides significant advantages over prior art devices having two hydraulic cylinders by eliminating a second hydraulic cylinder, the extra piping and connections needed for such apparatus, the means to synchronize the movement of two or more hydraulic cylinders, and the pressure and volume of the fluid supply relating thereto. However, it will be further appreciated that it is contemplated that the lift mechanism could include other constructions and configurations of apparatus that can force movement of the platform 18 directly relative to the base 12, or via forcing movement of some portion of the linkage assembly 50.

As seen in a number of the figures, the cart 10 of the present example further includes an upwardly extending handle 90. In the present example, the handle 90 includes a generally tubular structure that is connected to the base 12, such as by fixed connection via welding or use of other suitable fasteners. The handle 90 is shown as including generally vertical grasping portions 92, as well as generally horizontal grasping portions 94, all of which may be very useful to an operator seeking to control the position of the cart 10. It will be appreciated that while the handle 90 is shown as being fixedly connected to the base 12, it may alternatively be fixedly connected to the platform 18, and therefore, movable relative to the base 12.

Advantageously, unlike prior art carts for carrying pallets that have inherently unstable linkage structures and require a connection between the platform and an upwardly extending handle to control movement and stabilization of the platform, the linkage assembly 50 of the present disclosure, as described above, is inherently stable and avoids the need to be stabilized by an upwardly extending handle. This is a distinct advantage over the inherently unstable structures and drag in prior art structures, which also use a pair of lift devices instead of the single lift cylinder used in the present example cart 10. However, it will be appreciated that even such prior art structures could incorporate and benefit from other inventive subject matter herein, such as a drive system for the cart or use with the nestably stackable pallets A foot guard 96 extends downward and outwardly from the handle 90 and base 12 to protect an operator from inadvertently trapping a foot underneath the cart 10 or rearward wheels 16 of the cart 10. The foot guard 96 may be formed integrally with the handle 90 or may be separately formed and connected to the handle 90 or directly to the base 12, such as by welding or use of suitable fasteners.

The upwardly extending handle 90 also supports a housing 100. The housing 100 provides a location that holds the electrical components, such as a power source 102, shown for example as a pair of rechargeable batteries, an electrical control system 104 that may include a microprocessor and switches, and a hydraulic control system 106 that includes an electrical pump 108, a reservoir 110 and a control valve 112. A top face of the housing 100 presents an operation panel 114 having several controls including a key on/off switch 116, an emergency cutoff or stop knob 118, a lift controller 120 having up and down buttons, a battery discharge indicator 122, and a drive controller 124 having a joystick 126 that conveniently controls the direction of travel with simple thumb or finger actuation, and a speed selection button 128. The speed selection button 128 advantageously provides settings for a plurality of speeds, such as having three speeds for varied use when in close quarters or when traversing a large span. The battery discharge indicator 122 provides a visual indicator to inform the operator of the status of discharge of the one or more rechargeable batteries. This may allow the operator to try to conserve power, such as by operating the lift mechanism and selectively manually moving the cart by pushing and/or pulling on the upwardly extending handle 90. It will be appreciated that while two batteries are shown, one or more batteries could be used, depending on the power required, and electrical wiring W is used to couple electrical portions of components, while hydraulic piping H is used to couple hydraulic portions of components, with some of the wiring W and hydraulic piping H being shown for example but much of it not shown for convenience of seeing the key components.

The lift controller 120 is electrically coupled, such as by wiring or remote actuation, to the electrical control system 104 that assists in operating the hydraulic control system 106. The hydraulic control system 106 of the present example is electrically coupled to and operates the electrical pump 108 to operate the lift mechanism 54 in the form of the hydraulic lift cylinder to quickly and efficiently lift the platform 18 from the lowered first position as shown in FIGS. 1, 3, 7, 9, 12 and 13, to a raised second position, such as the fully raised position shown in FIGS. 2, 4-6 and 14, by pressing and holding the up button until raised. The platform 18 can be quickly lowered to the first position by pressing and holding the down button until the platform returns to the first position.

The drive controller 124 is electrically coupled, such as by wiring or remote actuation, to the electrical control system 104 that assists in operating a pair of drive motors 130. Each forward wheel 14 is coupled to one of the drive motors 130.

For instance, each drive motor 130 has a drive shaft and gear (not shown) that engage a gear on a rotatably supported axle shaft 20 to which a forward wheel 14 is connected (not shown). Thus, by operating the joystick 126, an operator actuates the drive controller 124 and the signals to the two drive motors 130 are modulated to vary the rotational speeds of the two drive motors 130, so as to propel the cart 10 as directed by the operator input to the joystick 126. It will be appreciated that turning the cart 10 can be accomplished by driving one motor 130 at a higher rotational rate than the other, which in an extreme condition will result in the cart 10 turning in a circle that effectively is defined by pivoting about the ground contact of one forward wheel 14 while the other forward wheel 14 is driven, resulting in the cart 10 turning in a circle, with the caster assemblies 22 for the rearward wheels 16 swiveling to allow the rearward wheels 16 to follow, as needed. Accordingly, the drive controller can be actuated to drive forward, rearward or in paths that include turning, as desired. Also, it will be appreciated that the cart could alternatively utilize a single drive wheel, with turning provided manually by directing or steering the cart 10 on the additional caster wheels, or by having the single drive wheel also be steerable.

Turning to FIGS. 13-17, one will appreciate one form of a nestably stackable reduced sized pallet 140. Thus, while the present cart 10 could be used with prior art stackable pallets that can be individually lifted by the cart 10, such pallets do not nest vertically when stacked, and therefore, require a very large volume of truck space when being transported.

This disclosure, however, further includes an advantageous pallet 140 for being transported on a cart having a platform that is configured to lift the pallet. The pallet 140 includes a molded plastic body, generally at 140, with the molded plastic body including a deck 142 having an upper surface 144 on which goods may be placed and a lower surface configured to be engaged by a platform of a cart that may be raised to lift the pallet. The pallet also includes a plurality of legs 148 extending downwardly from the deck 142, with the plurality of legs 148 being spaced apart longitudinally and laterally in a configuration that permits insertion of a fork of a forklift between the longitudinally spaced apart legs and that permits insertion of a platform of a cart or a forklift between the laterally spaced apart legs, and the plurality of legs 148 further being configured to be nestably stackable with legs 148 of a first pallet 140 being recessed within the legs 148 of a like second pallet 140 when the first pallet 140 is stacked atop the second pallet 140.

Figure 16:
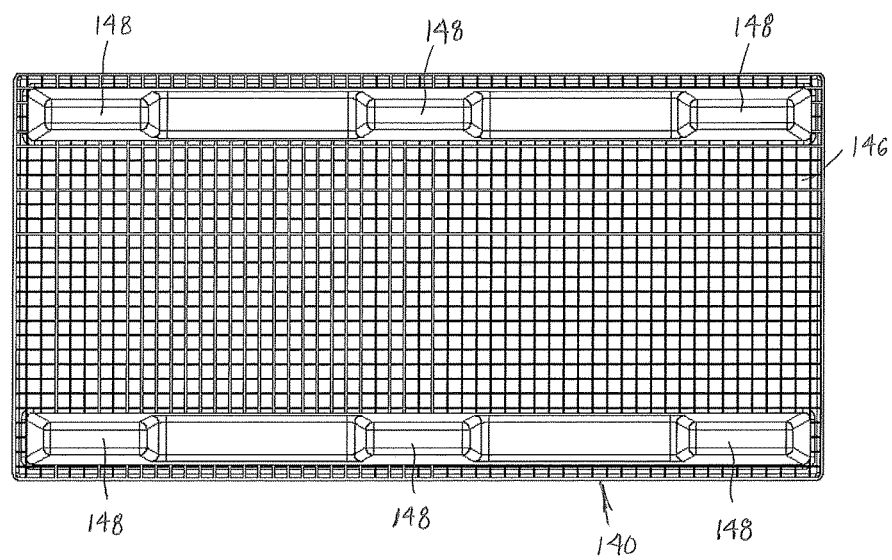
FIG. 16 is bottom plan view of pallet of FIG. 13.

Thus, the advantageous pallet 140 may be constructed by molding of substantially rigid plastics or other suitable materials. It will be appreciated that the molded body of the pallet 140 could include embedded structural elements constructed of other materials, if desired. Also, as shown in FIG. 16, the lower surface 146 may be formed so as to have a webbed structure for reduced weight. The plurality of legs 148 are essentially hollow and are configured to have side walls that have a draft angle, so as to permit the legs 148 of one pallet 140 to be nestably stackable, and therefore, recessed within like legs 148 of a second pallet 140.

Figure 13:
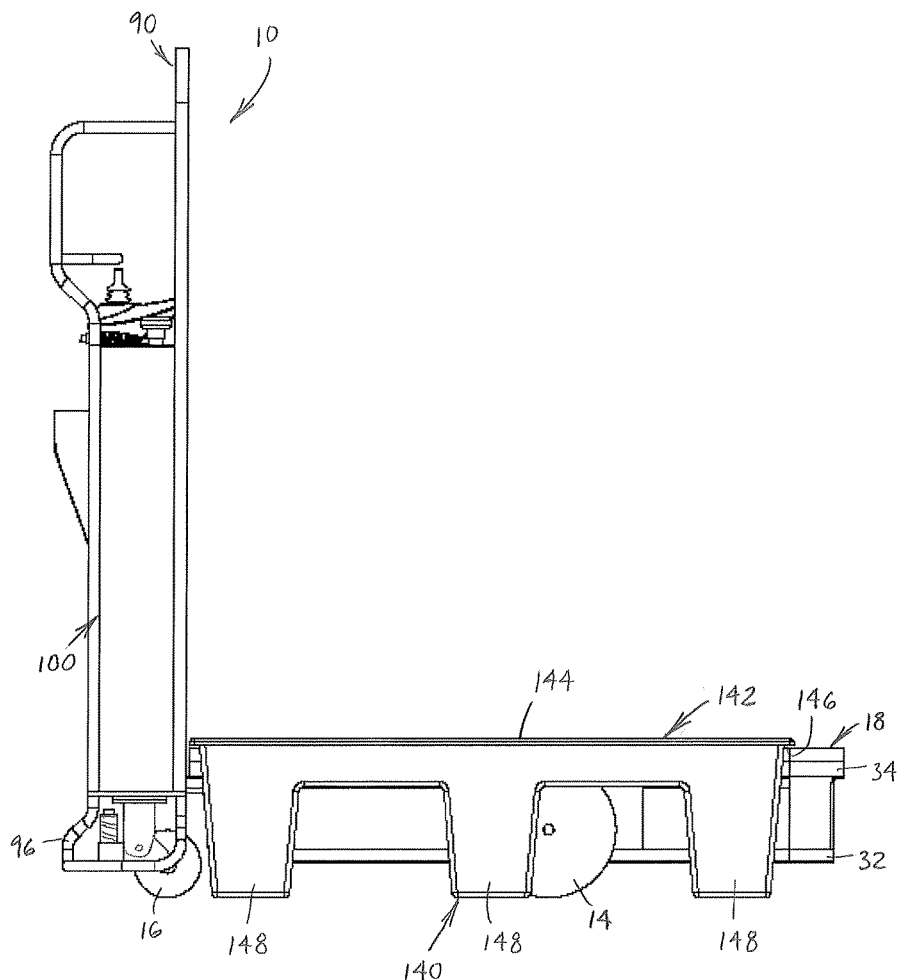
FIG. 13 is a side plan view of the cart of FIG. 1, with the platform in the first position and located beneath a pallet lifting surface.
Figure 14:
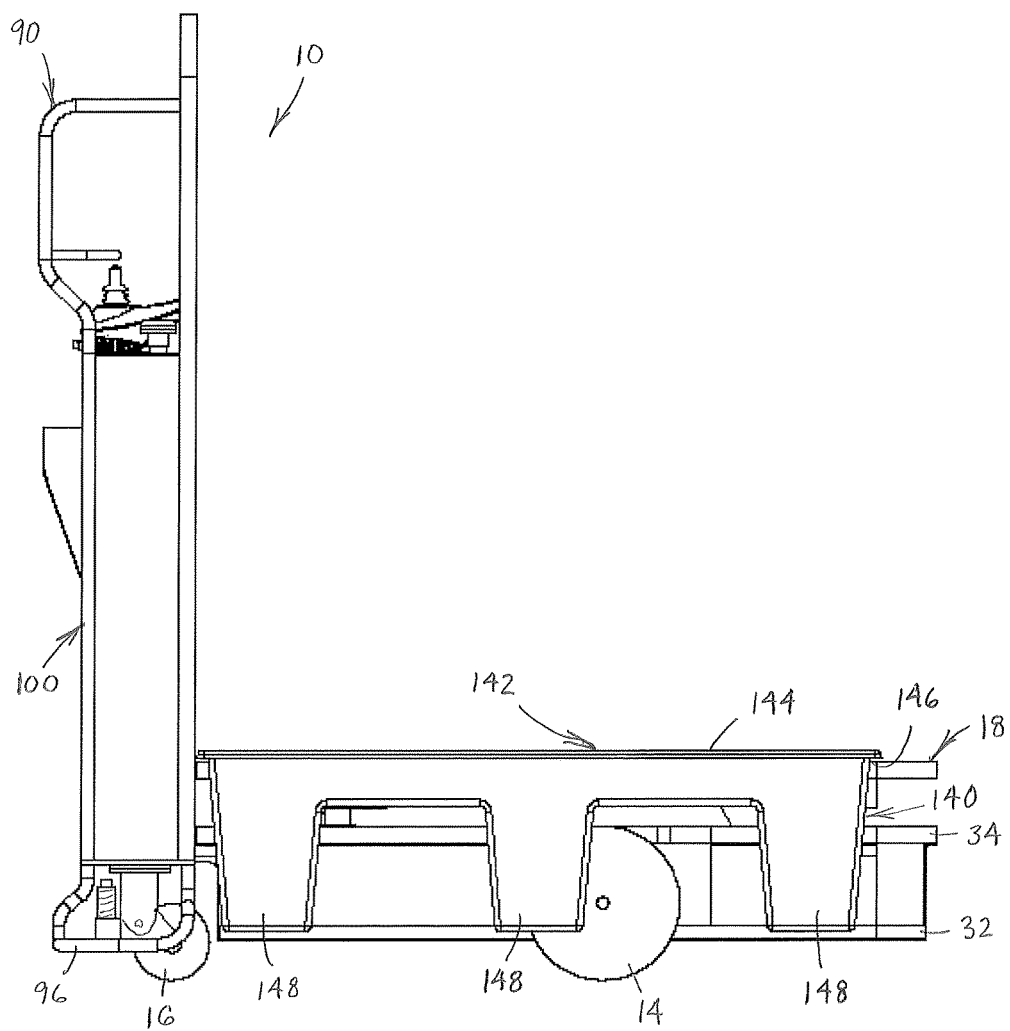
FIG. 14 is a side plan view of the cart and pallet of FIG. 13, with the platform in the second position wherein the pallet is lifted above the ground surface.
Figure 15:
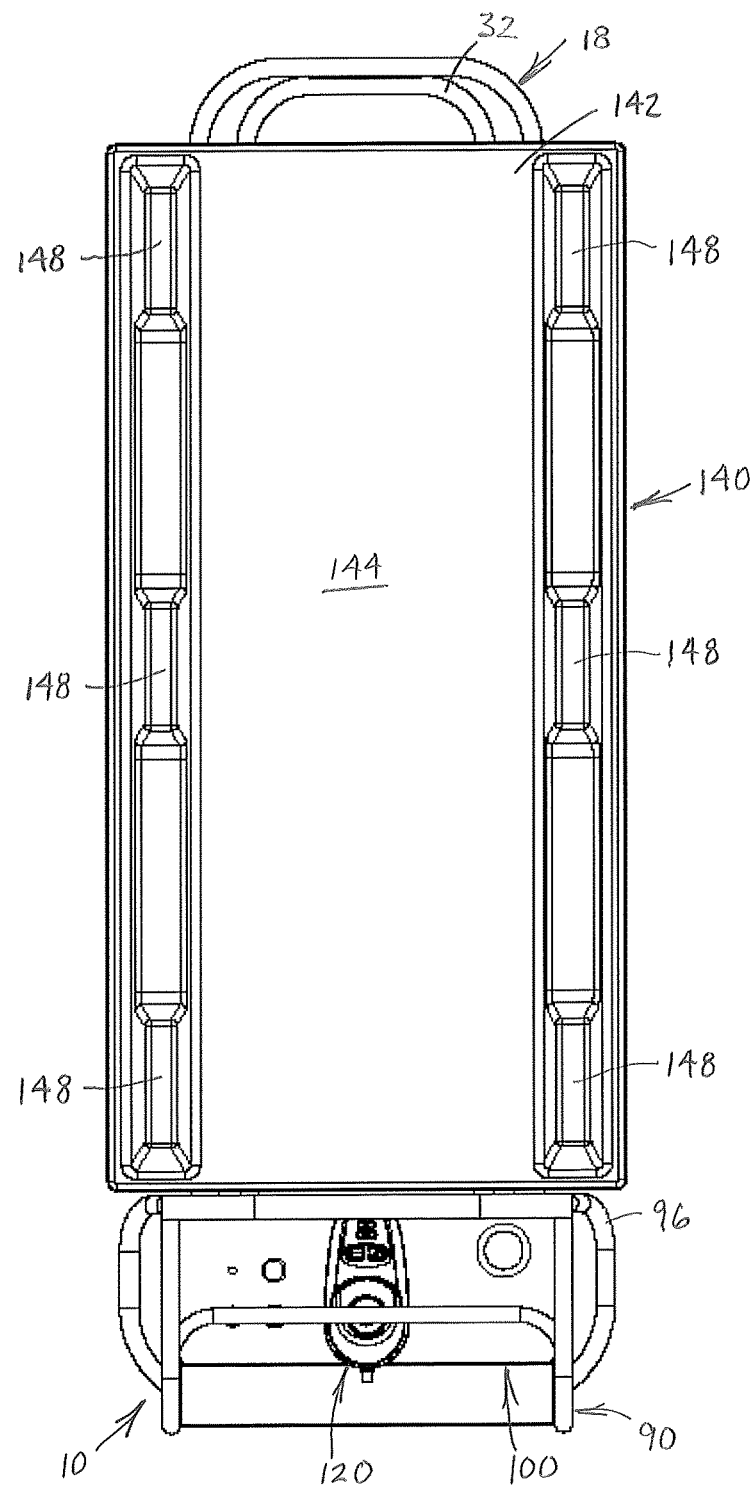
FIG. 15 is a top plan view of the cart and pallet of FIG. 13.

The pallet 140 presents the upper surface 144 to receive stacked goods, while the lower end of the legs 148 rest on a ground or floor surface. Once loaded with goods, a fork lift may be used to move a pallet 140 by moving the forks between the gaps formed between the longitudinally spaced legs 148 while it is resting on the ground surface, or a cart 10 may be used to move the pallet 140 by moving the platform 18 between the laterally spaced legs 148, as shown in FIGS. 13-15. It will be appreciated that a fork of a forklift also may be moved to a position between the laterally spaced legs 148, as well, and adapters may be used on such forks to achieve a wider, more stable lifting surface.

Figure 17:
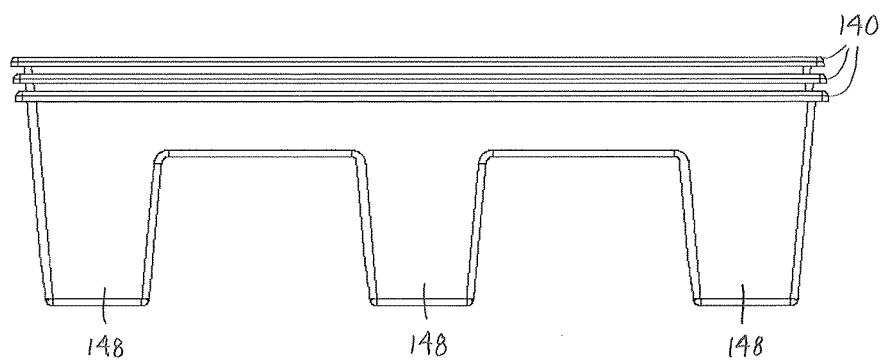
FIG. 17 is a side plan view of three pallet of the type shown in FIG. 13 and being nestably stacked.

When seeking to return or restock the pallets 140, the new nestably stackable configuration shown in FIG. 17 permits a significant space savings, while also enhancing the resistance to toppling for a stack of empty pallets 140 by lowering the center of gravity of the stacked pallets 140, increasing the density of the stack and interleaving the pallets 140 to resist the tendency to slide off of or become dislodged from one another. This also can provide advantageous savings in terms of the reduced number of trips necessary to carry stacks of empty pallets 140 and in the smaller volume necessary for shipping a given volume of empty pallets 140.

It will be appreciated that the cart 10 and pallets that permit such a cart 10 to lift the pallet, such as pallets 140, may be utilized in a method of using a cart to move a pallet from a floor surface of a truck having a rear lift to a floor surface in an interior of a building. The method includes the steps of providing a cart 10 having an adjustable height platform 18 and a drive system having drive motors 130 including a base 12, a plurality of wheels rotatably coupled to the base 14, 16, at least two of the plurality of wheels 14 being coupled to two separate drive motors 130 respectively, a drive controller 124 being electrically coupled to the drive motors 130. A platform 18, a linkage assembly 50 coupled to and disposed between the base 12 and the platform 18, a lift mechanism 54 coupled to and disposed between the base 12 and the platform 18, a lift controller 120 coupled to the lift mechanism, an upwardly extending handle 90, and the platform being movable between a first position and a second position that is above the first position. The method further includes actuating the drive controller 124 wherein the drive motors 130 move the cart 10 to a location within a truck having a rear lift and having a pallet resting on a floor surface of the truck wherein the platform 18 is in the first position and is disposed between the pallet and the floor surface of the truck. The method includes actuating the lift controller 124 wherein the lift mechanism 54 moves the platform 18 to the second position and suspends the pallet in a lifted position above the floor surface of the truck, actuating the drive controller 124 wherein the drive motors move the cart 10 to a location on the rear lift of the truck, lowering the rear lift of the truck to a ground level, actuating the drive controller 124 wherein the drive motors 130 move the cart 10 to a location within the interior of a building, and actuating the lift controller 124 wherein the lift mechanism 54 moves the platform 18 to the first position wherein the pallet is resting on a floor surface in the interior of the building.

Turning to FIGS. 18-26, a second example embodiment is provided. The second example cart 210 includes a number of similar components to those shown and described in reference to the first example cart 10, with a few notable exceptions. First, the cart 210 does not include a foot guard 96 extending around the rear of the cart 210. Second, the hydraulic control system 306 is located on the lower frame 232 of the base 212, rather than in the upright housing 100. Third, without needing to house the hydraulic control system 306, the housing 300 is thinner. Fourth, the controls are not all found on a common operation panel 114, but rather the drive controller 324 is located on a plate 315 that is located above an operation panel 314, where the other controls are located. Fifth, the cart 210 does not include a key on/off switch 116, but rather has the power on/off function included in the cutoff or stop knob 318. These modifications relative to the first embodiment allow the second cart 210 to be used essentially in a similar way to the first example cart 10, to lift and transport pallets, such as was described in connection with the method of using a cart to move a pallet from a floor surface of a truck having a rear lift to a floor surface in an interior of a building. The description of the materials used and the means of connection of components with the first example cart 10 are applicable to components of the second example cart 210, as well. Accordingly, an abbreviated description of the second example embodiment will be provided.

The cart 210 of the second example includes a base 212 having a plurality of wheels 214, 216 rotatably coupled to the base 212, and a platform 218 that is movable between a first position and a second position that is above the first position. The cart 210 includes a pair of forward wheels 214 rotatably coupled to the base 212 by being rotatably connected to axles 220 that are mounted to the base 212, wherein the axles 220 extend perpendicularly to a longitudinal axis L' (seen in FIG. 26) of the base 212. A pair of rearward wheels 216 is rotatably coupled to the base 212 on caster assemblies 222. The rearward wheels 216 are mounted on axles 224 that are connected to axle brackets 226 of the caster assemblies 222 that swivel about a vertical axis V' (seen in FIG. 22). The caster assemblies 222 also may include a resilient element 228, such as one or more springs operably configured to provide a suspension between caster brackets 230 that pivot about the vertical axis V' while also being pivotably connected at their lower end to axle brackets 226. In this example, each caster assembly 222 includes two resilient elements 228, as may be seen in FIG. 24, for increased load capacity.

As with the first example cart 10, the use of four wheels 214, 216, with the forward wheels 214 positioned lengthwise forward of the center of the platform 218, and the rearward wheels 216 positioned beneath the rear of the cart, reduces the tendency of the cart 210 to tip forwardly, and therefore, the need to have an additional pair of wheels at the front of the base 212. The reduced costs, complexity and weight afforded as advantages by using the wheels 214, 216 and their configuration on the based 212 are similar to those noted with respect to the first example cart 10. This is true also with respect to the advantages in the form of the improved, more secure feeling for the operator when the wheels 214, 216 of the cart 210 are kept in contact with the surface over which the cart 210 is traveling, as opposed to the rocking permitted in some prior art carts. Alternative wheel arrangement mentioned with respect to the first cart 10 also would be possible with a cart otherwise made in accordance with the second example.

The base 212 essentially provides a chassis of the cart 210. In this example, the base 212 is configured to include a lower frame 232 that extends lengthwise between the forward wheels 214, and an upper frame 234 that includes inward deviations 236 in the area of the forward wheels 214 that facilitate having the forward wheels 214 generally remain within the overall width profile of the upper frame 234, as may be seen in FIG. 25 with the platform 218 removed for convenience of viewing components within the base, and in FIG. 26 with the platform 218 being located directly above the upper frame 234. As with the first example, structural members, such as plates and tubing portions may be used to construct the platform 218, the upper frame 234 and the lower frame 232, as well as to connect the upper and lower frames 232, 234. In this second example sections of tubing, such as steel square tubing or the like, are used throughout the platform 218, and the upper and lower frames 232, 234, along with plates, such as steel plate or the like. Such plates and tubing may be joined in any suitable manner, such as by use of welding or fasteners. For instance, a front plate 238 and side plates 240, 242, extend upward from the perimeter of the lower frame 232 and support the upper frame 234. Use of plates may additionally provide protective guards for components located within the base 212, while they also may provide broad structural support, such as can be appreciated with the generally horizontal plate 244 within the platform 218 that serves to transmit lifting loads to the platform over an extended surface area. It also will be appreciated that the platform 218, lower frame 232 and upper frame 234 could be formed in other ways and of other materials, such as formed sheet metal, molded plastics or other substantially rigid materials, and the top surface of the platform 218 may be completely closed, as may the bottom surface of the lower frame 232 and the upper surface of the upper frame 234, except as needed to permit movement of the lift mechanism 254 and connection of the platform 218 to the base 212.

Figure 22:
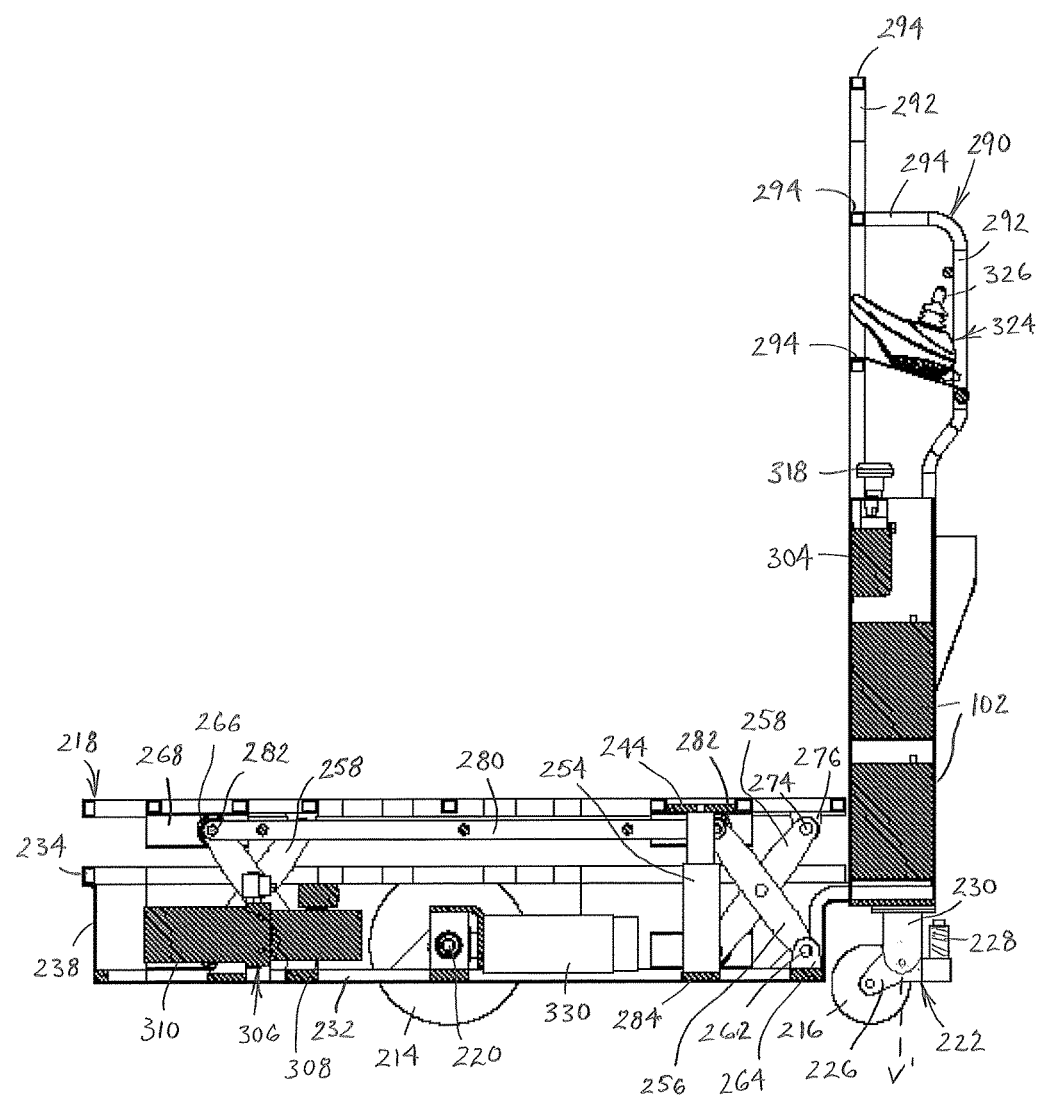
FIG. 22 is a cross-sectional side view of the cart of FIG. 18 taken through the section line 22-22 in FIG. 21, with the platform in a second position.
Figure 23:
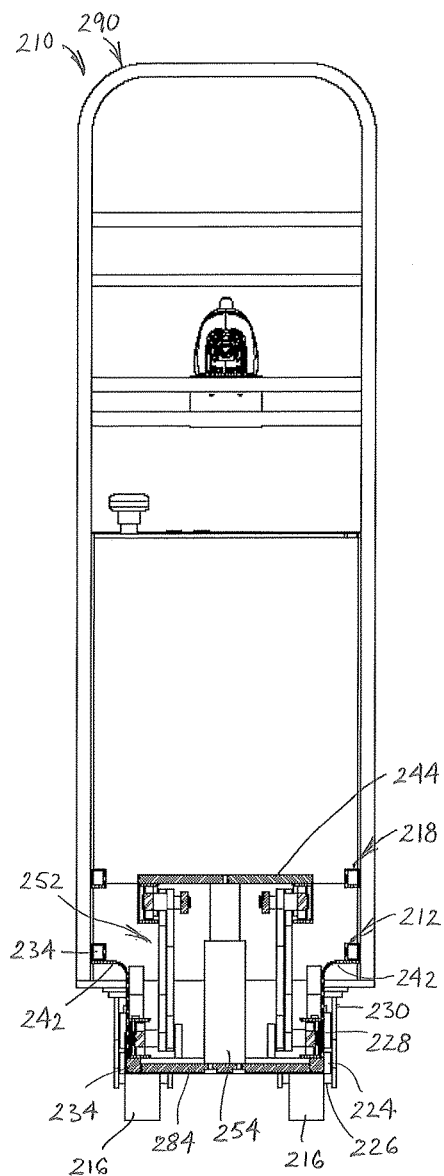
FIG. 23 is a cross-sectional front view of the cart of FIG. 18 taken through the section line 23-23 in FIG. 19, with the platform in a second position.
Figure 24:
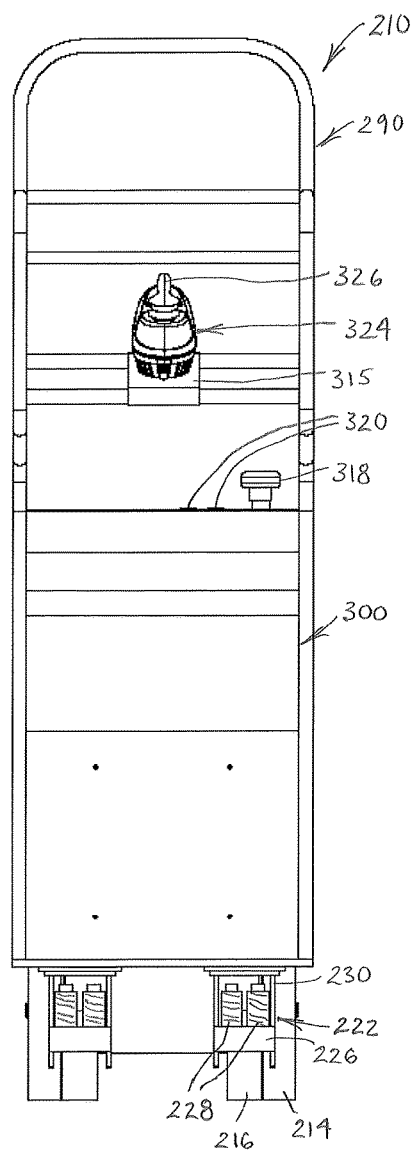
FIG. 24 is a rear plan view of the cart of FIG. 18.
Figure 25:
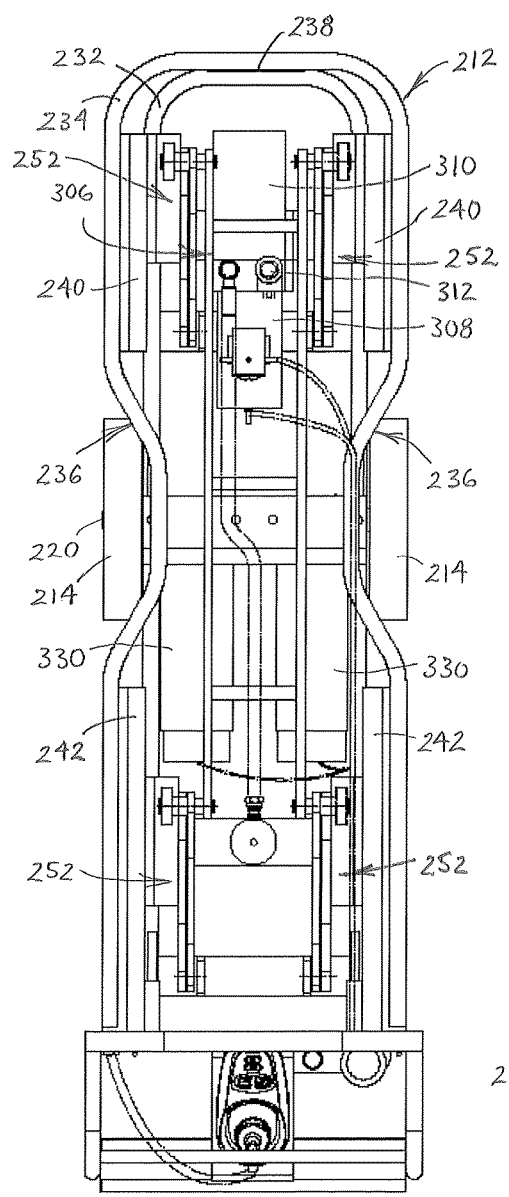
FIG. 25 is a top plan view of the cart of FIG. 18, having the height adjustable platform removed to provide a better view of the components that are connected to and extend upward from the base.

As may be best appreciated in FIG. 22, a linkage assembly 250, much like the linkage assembly 50 of the previously discussed first example cart 10, includes at least two laterally spaced pairs of scissor arms 252 that are coupled to and disposed between the base 212 and the platform 218, and a lift mechanism 254 is coupled to and disposed between the base 212 and the platform 218. Each pair of scissor arms 252 includes left and right first and second arms 256, 258, with each arm being connected to both the lower frame 232 and the upper frame 234, while being connected to each other at a pivot 260 along their respective mid-sections. First ends of the first arms 256 are pivotally connected to the lower frame 232 at fixed pivots 262 on flanges 264 that are fixed to the lower frame 232 of the base 212, and second ends of the first arms 256 are connected slidably to the platform 218 at roller bearings 266 in channels 268 that are fixed to the platform 218. To complete the pairs of scissor arms 252, first ends of the second arms 258 are connected slidably to the lower frame 232 at roller bearings 270 in channels 272 that are fixed to the lower frame 232, and second ends of the second arms 258 are pivotally connected to the platform 218 at fixed pivots 274 on flanges 276 that are fixed to the platform 218.

Figure 18:
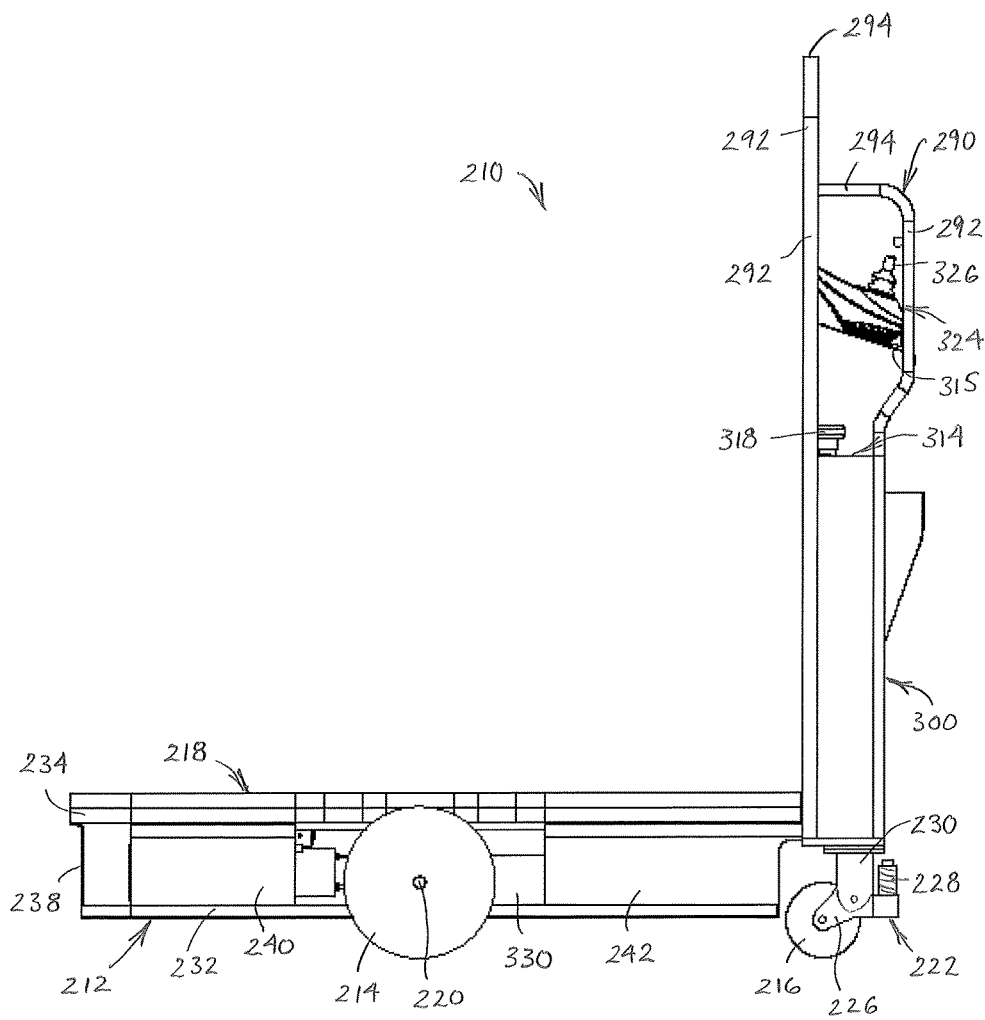
FIG. 18 is a side plan view of a second example cart having a height adjustable platform in a first position and a drive system for moving the cart across a ground surface.
Figure 19:
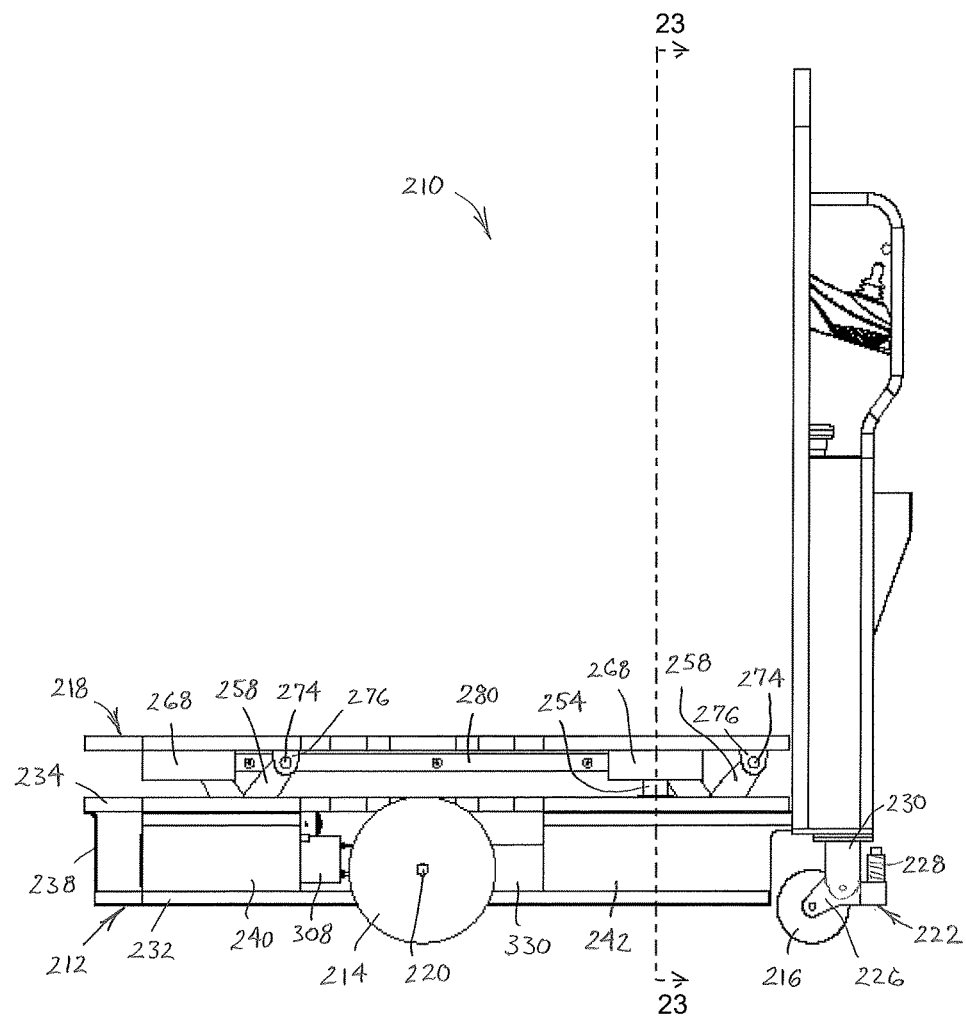
FIG. 19 is a side plan view of the cart of FIG. 18, with the platform in a second position and including a section line 23-23 relating to the cross-sectional view shown in FIG. 23.
Figure 20:
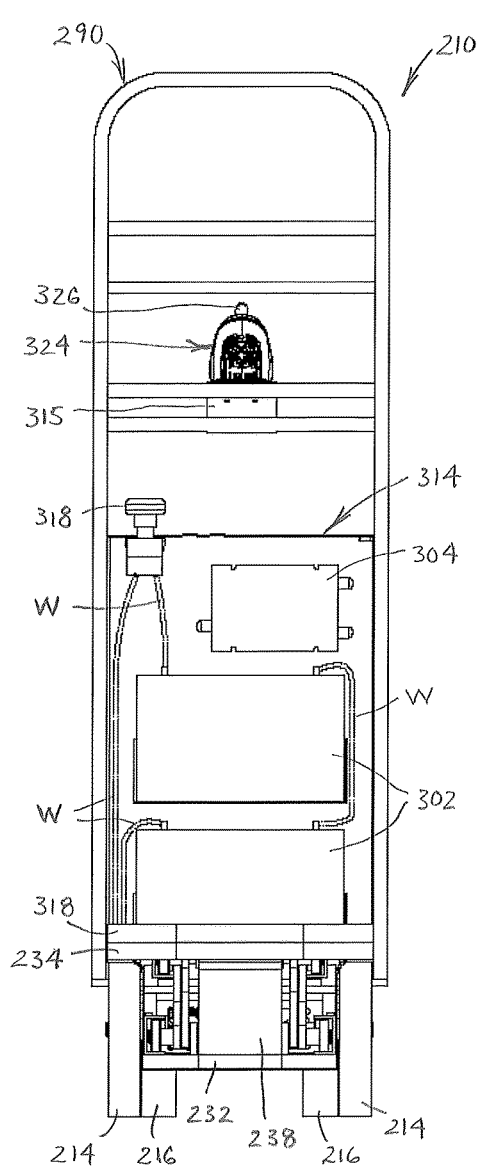
FIG. 20 is a front plan view of the cart of FIG. 18, with the platform in the first position and providing a view of the components located within the upright housing as if the front wall of the housing were removed.
Figure 21:
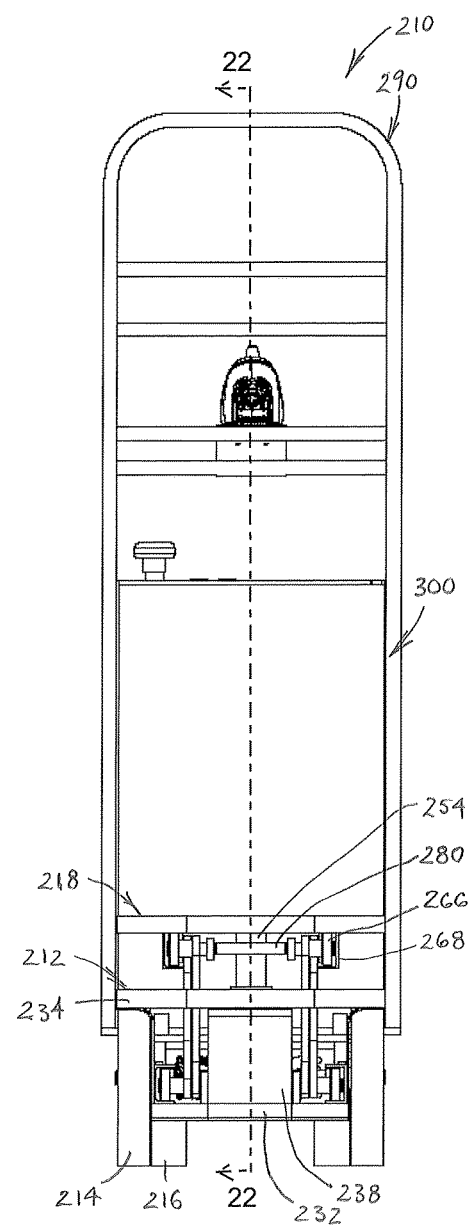
FIG. 21 is a front plan view of the cart of FIG. 18, with the platform in the second position and including a section line 22-22 relating to the cross-sectional view shown in FIG. 22.
Figure 26:
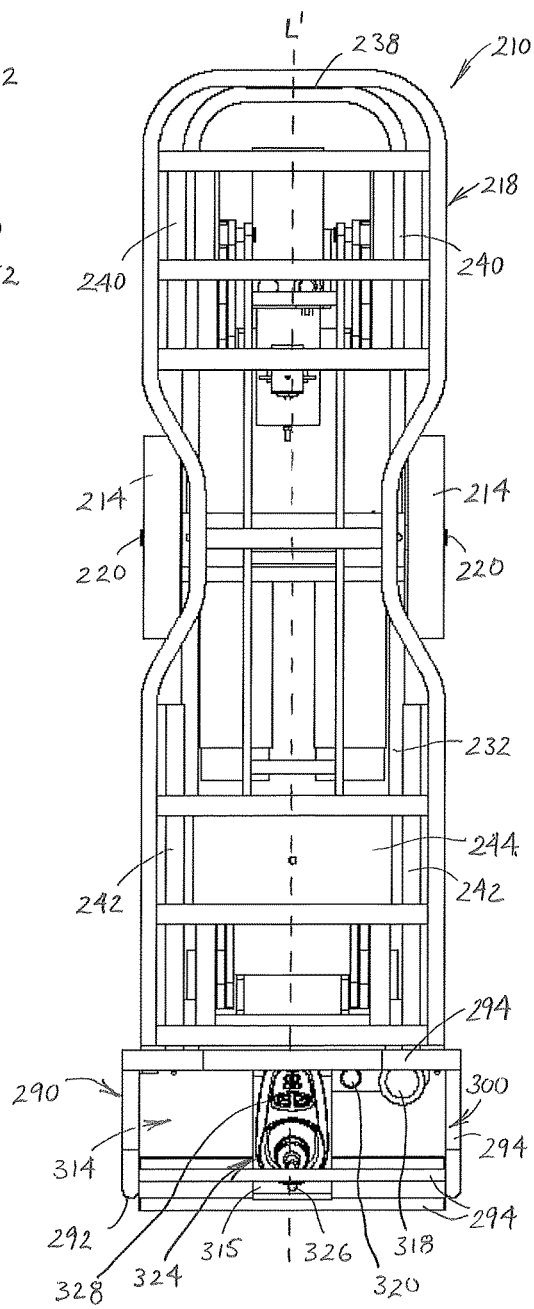
FIG. 26 is a top plan view of the cart of FIG. 18, with the platform in the second position.
Figure 27:
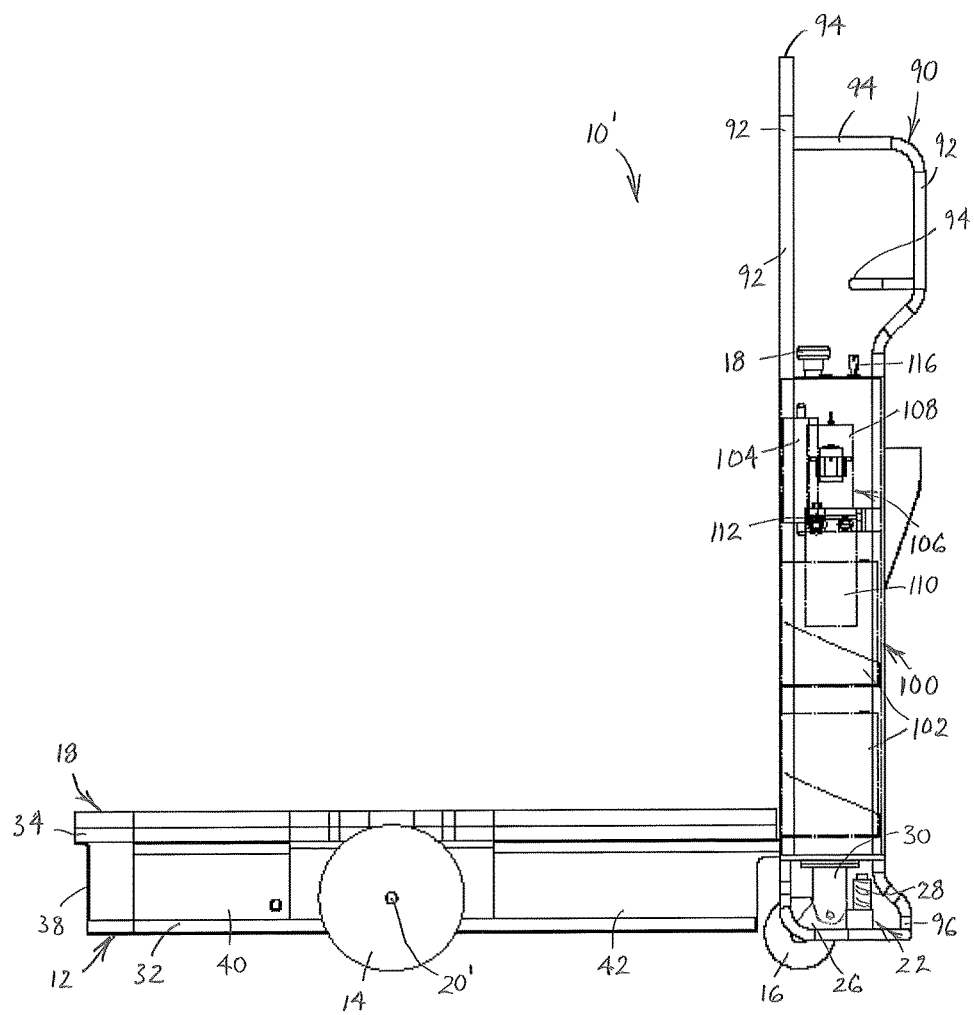
FIG. 27 is a side plan view of a third example cart having a height adjustable platform in a first position and without a drive system.
Figure 28:
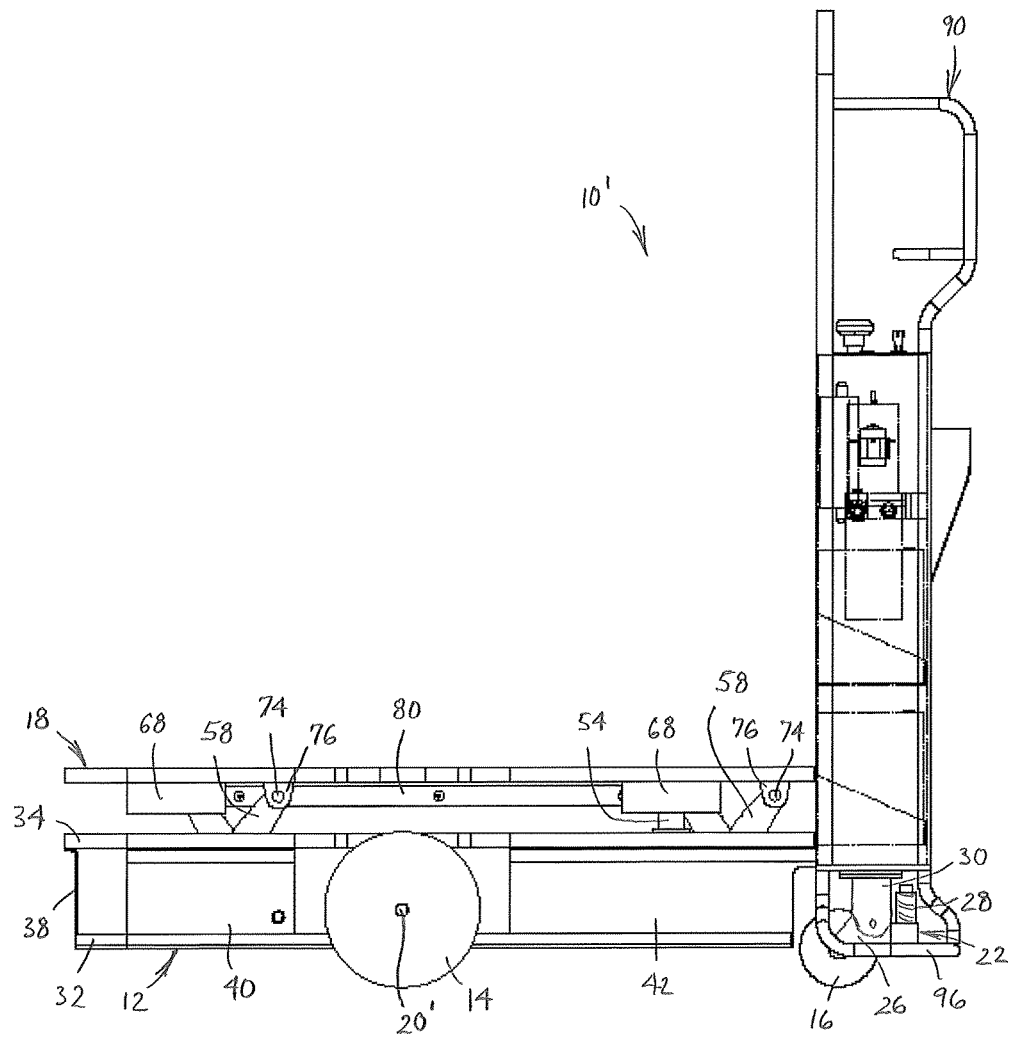
FIG. 28 is a side plan view of the cart of FIG. 27, with the platform in a second position.
Figure 29:
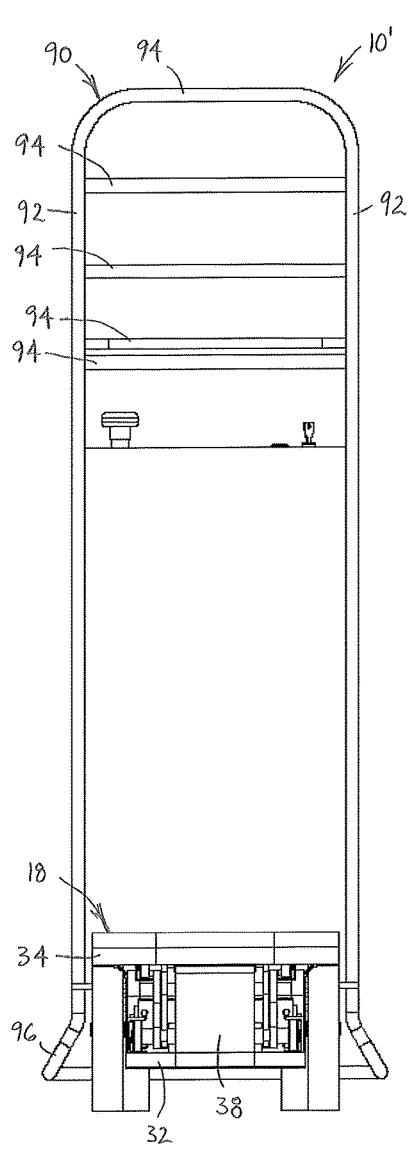
FIG. 29 is a front plan view of the cart of FIG. 27, with the platform in the first position.
Figure 30:
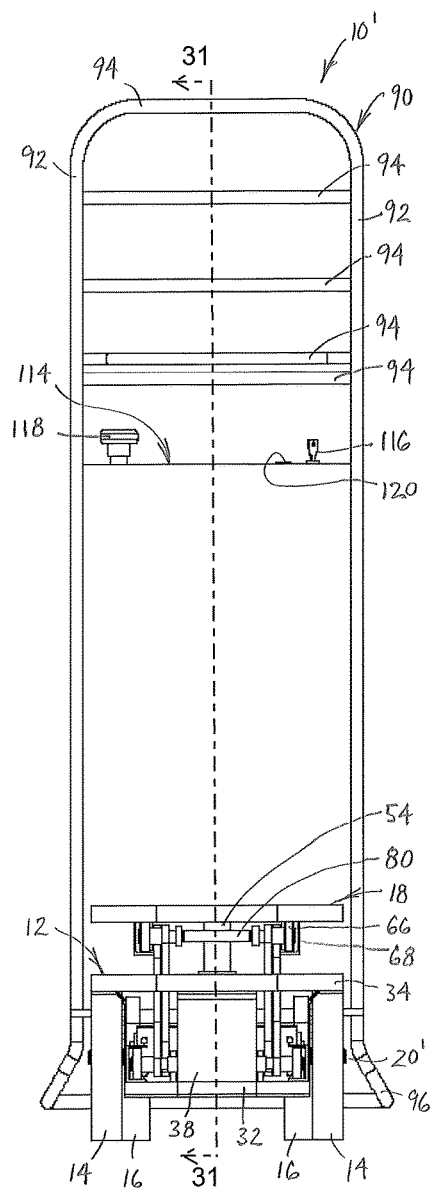
FIG. 30 is a front plan view of the cart of FIG. 27, with the platform in the second position and including a section line 31-31 relating to the cross-sectional view shown in FIG. 31.

As with the prior example, in this second example, a synchronizing strut 280 having a lightweight structure is pivotally connected at its ends to the second ends of the first arms 256, such as at posts 282 that also support the roller bearings 266. Unlike the prior art devices, the two laterally spaced pairs of scissor arms 252 and synchronizing strut 280 of the linkage assembly 250 provide a stable connection between the base 212 and the platform 218. This linkage assembly 250 is inherently stable in the sense that it maintains the platform 218 parallel to and directly above the base 212 without a tendency of the platform 218 to shift or sway forward, rearward, to the left or to the right, whether in a first position in contact with or close to the upper frame 234, as shown in FIGS. 18, 20 and 26, or in a second position that is above the first position, as shown in FIGS. 19, and 21-24. As such, the lift mechanism 254 may be located at a single location between the base 212 and platform 218.

The lift mechanism 254 of the second example is shown as a single hydraulic cylinder having the lower end of its cylinder connected to a cross plate 284 on the base 212 and having the upper end of its piston connected to the generally horizontal plate 244 within the platform 218. This construction and configuration provides the same advantages discussed above with respect to the first example cart 10 but it will be appreciated that the carts 10, 210 could use two or more hydraulic cylinders, such as if it is desired to accommodate a higher lift capacity, or to build in redundancy of the lift function, or could include other constructions and configurations of apparatus that can force movement of the platform 218 directly relative to the base 212, or via forcing movement of some portion of the linkage assembly 250.

The second example cart 210 includes an upwardly extending handle 290, optionally having a generally tubular structure that is connected to the base 212, such as by fixed connection via welding or use of other suitable fasteners. The handle 290 is shown as including generally vertical grasping portions 292, as well as generally horizontal grasping portions 294, all of which may be very useful to an operator seeking to control the position of the cart 210, or when the cart 210 has lost power and needs to be retrieved. It will be appreciated that while the handle 290 is shown as being fixedly connected to the base 212, it may alternatively be fixedly connected to the platform 218, and therefore, movable relative to the base 212.

As noted with the first example cart 10, the linkage assembly 50 of the second example is advantageous because of the inherently stable scissor constructions. Thus, the linkage assembly 250 of the present disclosure, as described above, avoids the need to be stabilized by an upwardly extending handle. This is a distinct advantage over the inherently unstable structures and drag in prior art structures, which also use a pair of lift devices instead of the single lift cylinder used in the present example cart 210. As noted previously, it will be appreciated that even such prior art structures could incorporate and benefit from other inventive subject matter herein, such as a drive system for the cart or use with the nestably stackable pallets As noted above, a foot guard is not provided around the rear of the cart 210, which simplifies the structures and reduces weight. The upwardly extending handle 290 supports a housing 300 that is a bit thinner than the housing 100. As with the housing 100, the housing 300 provides a location that holds the electrical components, such as a power source 302, shown for example as a pair of rechargeable batteries, an electrical control system 304 that may include a microprocessor and switches. However, the hydraulic control system 306 that includes an electrical pump 308, a reservoir 310 and a control valve 312 are located in the base 212 of the second example.

A top face of the housing 300 presents an operation panel 314 having controls including an emergency or everyday cutoff or stop knob 318, and a lift controller 320 having up and down buttons. A battery discharge indicator optionally may be provided, and a drive controller 324 having a joystick 326 that conveniently controls the direction of travel with simple thumb or finger actuation, and a speed selection button 328 may be provided at a convenient hand height for the operator on a plate 315 that is located above an operation panel 314. As noted with respect to the first example cart 10, if the second example cart 210 includes a speed selection button 328 or other such control, the cart 210 may advantageously provide for use at more than one speed setting, which would be beneficial when adjusting for use in close quarters or when traversing a large span. A battery discharge indicator may be provided, as discussed with the first example cart 10, so as to try to avoid falling victim to a discharged battery in the middle of a delivery or other task, to conserve power, or to try minimize the number of charging cycles by more deeply discharging the batteries prior to connecting to a recharger.

As with the first example cart 10, an operator may move the cart 210 manually, if necessary, by pushing and/or pulling on the upwardly extending handle 290. It will be appreciated that with the thinner housing 300, the second example is shown using two relatively thinner batteries 302 than the batteries 102 shown in the first example cart 10. As noted previously, it will be appreciated that one or more batteries could be used, depending on the power required and the desired performance, and electrical wiring W is used to couple electrical portions of components, while hydraulic piping H is used to couple hydraulic portions of components, with some of the wiring W and hydraulic piping H being shown for example but much of it not shown for convenience of seeing the key components.

The lift controller 320 is electrically coupled, such as by wiring or remote actuation, to the electrical control system 304 that assists in operating the hydraulic control system 306. The hydraulic control system 306 of the second example is electrically coupled to and operates the electrical pump 308 to operate the lift mechanism 254 in the form of the hydraulic lift cylinder to quickly and efficiently lift the platform 218 from the lowered first position as shown in FIGS. 18, 20 and 26, to a raised second position, such as the fully raised position shown in FIGS. 19, and 21-24, by pressing and holding the up button until raised. The platform 218 can be quickly lowered to the first position by pressing and holding the down button until the platform returns to the first position.

The drive controller 324 is electrically coupled, such as by wiring or remote actuation, to the electrical control system 304 that assists in operating a pair of drive motors 330. Each forward wheel 214 is coupled to one of the drive motors 330. For instance, each drive motor 330 has a drive shaft and gear (not shown) that engage a gear on a rotatably supported axle shaft 220 to which a forward wheel 214 is connected (not shown). Thus, by operating the joystick 326, an operator actuates the drive controller 324 and the signals to the two drive motors 330 are modulated to vary the rotational speeds of the two drive motors 330, so as to propel the cart 210 as directed by the operator input to the joystick 326. It will be appreciated that turning maneuvers for the cart 210 can be accomplished in a similar manner to those described above with respect to the first example cart 10. Accordingly, the drive controller 324 can be actuated to drive forward, rearward or in paths that include turning, as desired. Also, it will be appreciated that the cart could alternatively utilize a single drive wheel, with turning provided manually by directing or steering the cart 210 on the additional caster wheels, or by having the single drive wheel also be steerable.

It will be appreciated that the cart 310 may be used with the prior art pallets of reduced size or with the advantageous pallets 140 described above and shown in FIGS. 13-17, to achieve similar benefits to those that were previously discussed with respect to the use of the cart 10 and nestably stackable pallets 140. When seeking to return or restock the pallets 140, the cart 210 may be used with the new nestably stackable configuration of pallets shown in FIG. 17, to attain significant space savings, increase the resistance to toppling, increase the density of the stack of the pallets, and to resist the tendency to slide off of or become dislodged from one another. These advantages can be leveraged by the advantageous savings in terms of the reduced number of trips necessary to carry stacks of empty pallets 140 and in the smaller volume necessary for shipping a given volume of empty pallets 140.

For the reasons discussed above, it will be appreciated that the cart 210 and pallets that permit such a cart 210 to lift the pallet, such as for example pallets 140, may be utilized in a method of using a cart to move a pallet from a floor surface of a truck having a rear lift to a floor surface in an interior of a building. The method includes the steps of providing a cart 210 having an adjustable height platform 218 and a drive system having drive motors 330 including a base 212, a plurality of wheels rotatably coupled to the base 214, 216, at least two of the plurality of wheels 214 being coupled to two separate drive motors 330 respectively, a drive controller 324 being electrically coupled to the drive motors 330. A platform 218, a linkage assembly 250 coupled to and disposed between the base 212 and the platform 218, a lift mechanism 254 coupled to and disposed between the base 212 and the platform 218, a lift controller 320 coupled to the lift mechanism, an upwardly extending handle 290, and the platform being movable between a first position and a second position that is above the first position. The method further includes actuating the drive controller 324 wherein the drive motors 330 move the cart 210 to a location within a truck having a rear lift and having a pallet resting on a floor surface of the truck wherein the platform 218 is in the first position and is disposed between the pallet and the floor surface of the truck. The method includes actuating the lift controller 324 wherein the lift mechanism 254 moves the platform 218 to the second position and suspends the pallet in a lifted position above the floor surface of the truck, actuating the drive controller 324 wherein the drive motors move the cart 210 to a location on the rear lift of the truck, lowering the rear lift of the truck to a ground level, actuating the drive controller 324 wherein the drive motors 330 move the cart 210 to a location within the interior of a building, and actuating the lift controller 324 wherein the lift mechanism 254 moves the platform 218 to the first position wherein the pallet is resting on a floor surface in the interior of the building.

Turning now to a the third example cart 10', which is shown in FIGS. 27-34, one will appreciate that the third example cart 10' may be viewed as somewhat of an economy version among these advanced pallet moving machines. Upon close inspection, one will find that the third example cart 10' is very similar to the first example cart 10, except that the third example cart 10' does not include any of the components associated with the drive system introduced with the first example cart 10, or the components that would be needed to operate such a drive system. Accordingly, the same numbering for the components is used in the third example cart 10' as for the first example 10, but the third example does not include the drive controller 124 having a joystick 126 that controls the direction of travel, or the speed selection button 128, which would otherwise be located on the operation panel 114.

Figure 31:
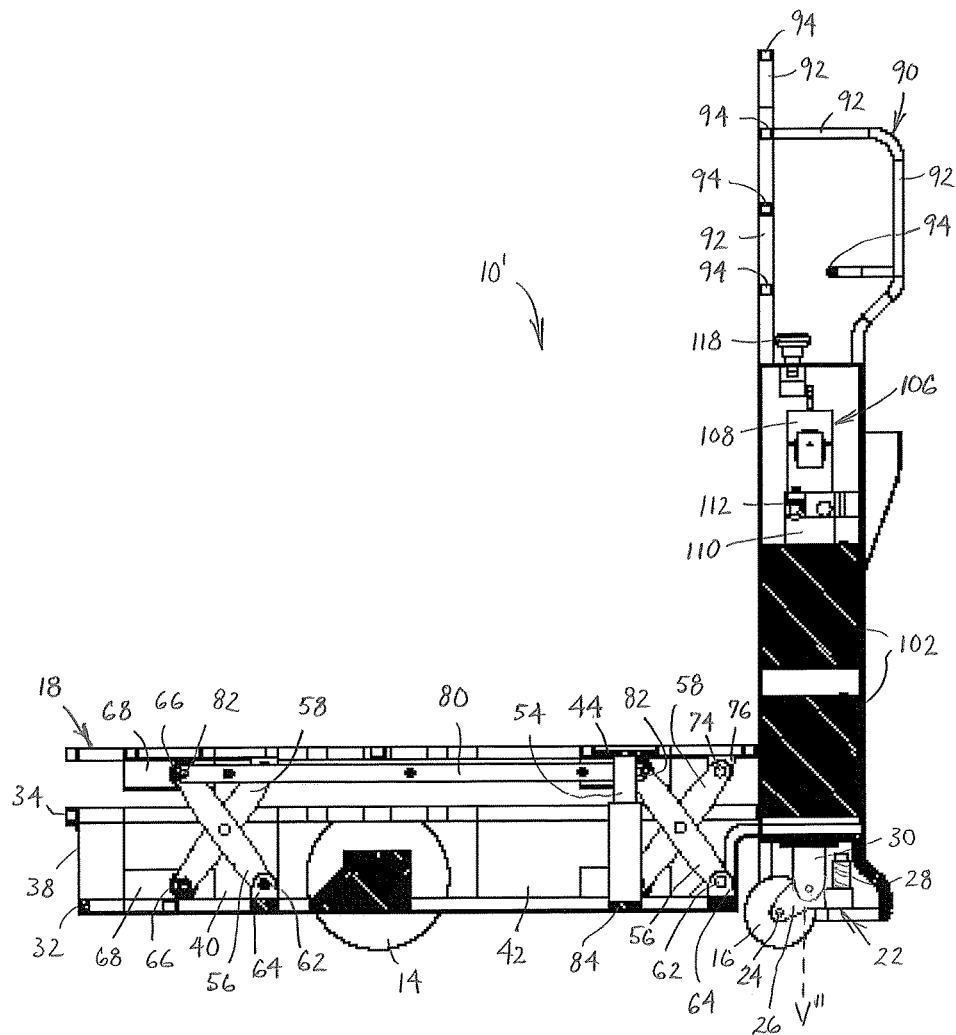
FIG. 31 is a cross-sectional side view of the cart of FIG. 27 taken through the section line 31-31 in FIG. 30, with the platform in a second position.
Figure 32:
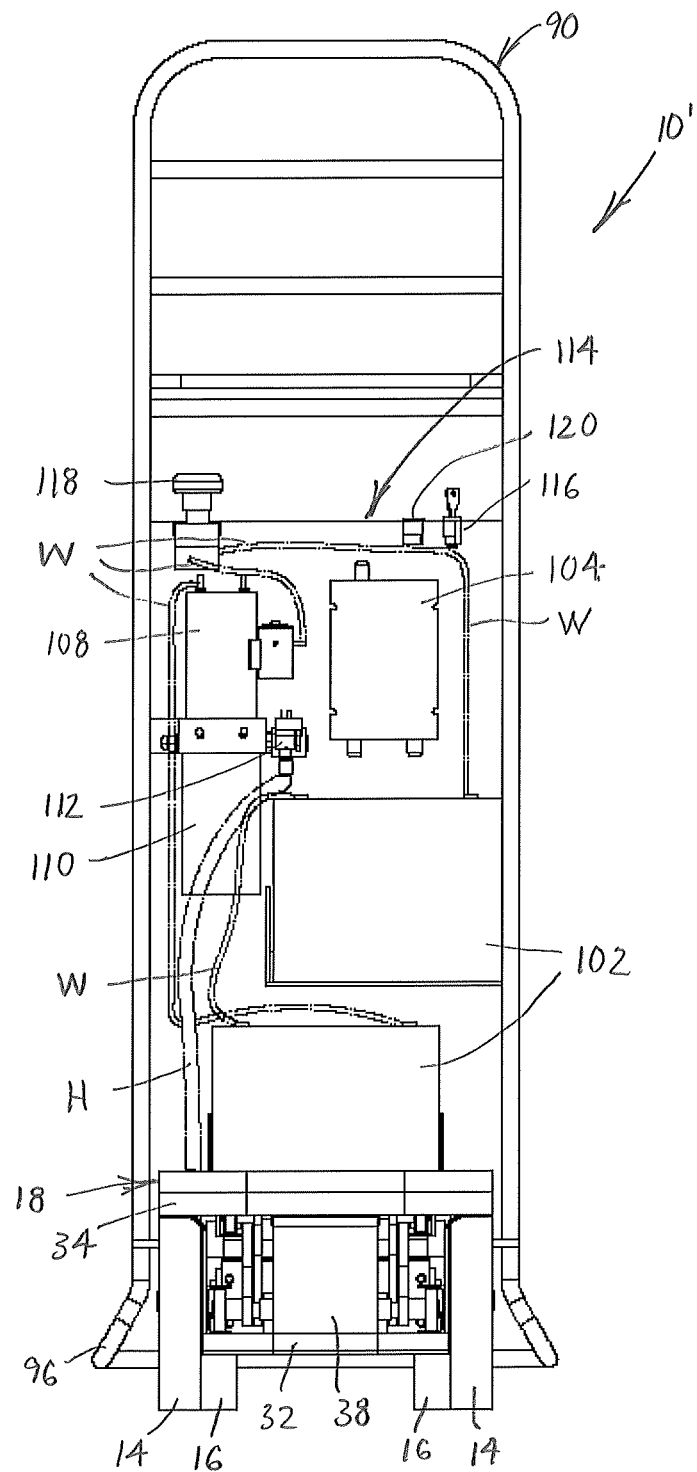
FIG. 32 is a front plan view of the cart of FIG. 27, with the platform in the first position and providing a view of the components located within the upright housing as if the front wall of the housing were removed.
Figure 33:
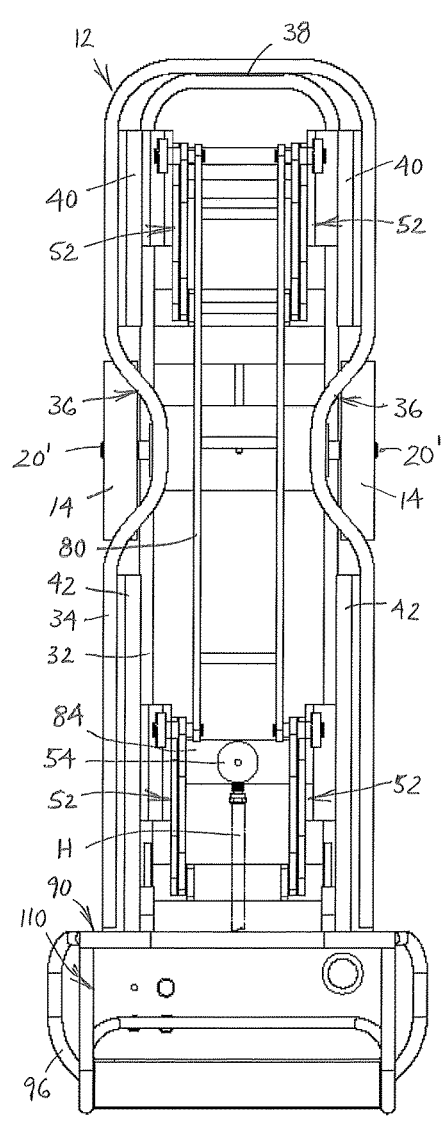
FIG. 33 is a top plan view of the cart of FIG. 27, having the height adjustable platform removed to provide a better view of the components that are connected to and extend upward from the base.
Figure 34:
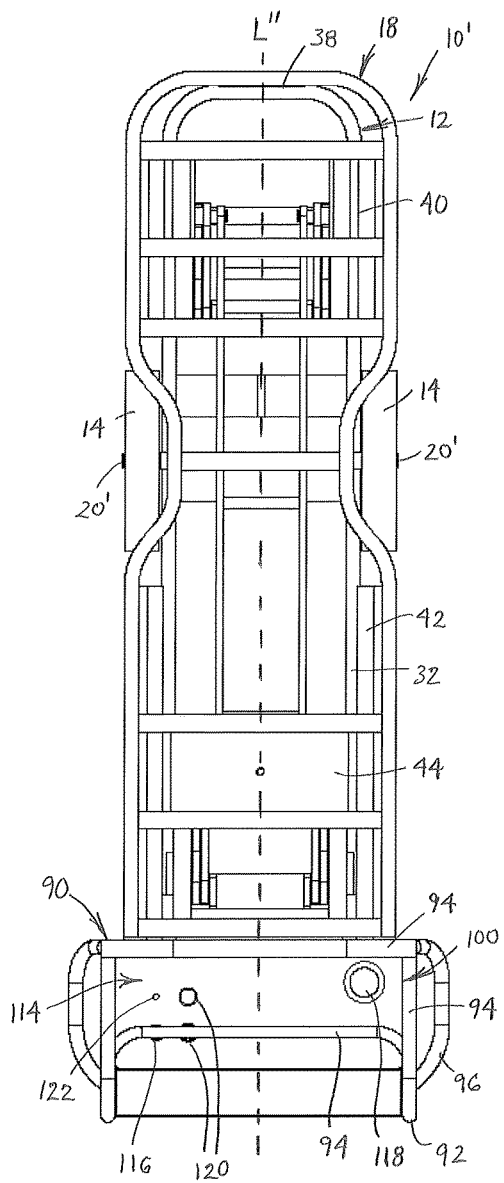
FIG. 34 is a top plan view of the cart of FIG. 27, with the platform in the second position.

Nor does the third example cart 10' include a pair of drive motors 130, or their coupling to drivable axle shafts 20, but instead includes fixed axle shafts 20' that extend perpendicularly relative to the longitudinal axis L" of the third example cart 10' (seen in FIG. 34), that are forward of caster assemblies 22 that swivel about a vertical axis V'" (seen in FIG. 31). Accordingly, the third example cart 10' is moved by manual input of an operator by pushing and/or pulling on the upward extending handle 90.

Thus, the operation of the third example cart 10' is identical to that of the first example cart 10, except for the lack of the drive system, and therefore, the absence of actuation of a drive controller 124 and the propulsion provided by the drive motors 130. Nevertheless, the third example cart 10' still provides numerous advantages over the prior art within at least the construction and configuration of the base 12 and its wheel assemblies, the linkage assembly 50, and the lift mechanism 54.

It will be appreciated that the disclosed examples present numerous potential combinations of elements for carts and pallets and methods of their use. Thus, while the present disclosure shows and demonstrates various example carts that may be adapted for use in transporting pallets, these examples are merely illustrative and are not to be considered limiting. It will be apparent to those of ordinary skill in the art that various carts and pallets may be constructed and configured for use in moving goods, without departing from the scope or spirit of the present disclosure. Thus, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

The invention claimed is:

1. A cart having an adjustable height platform, comprising:
   a base;
   a plurality of wheels rotatably coupled to the base;
   a platform located directly above the base;
   a linkage assembly including at least two laterally spaced apart pairs of scissor arms with a first of the at least two laterally spaced apart pairs of scissor arms being positioned forward of a second of the at least two laterally spaced apart pairs of scissor arms, and with each scissor arm of the at least two laterally spaced apart pairs of scissor arms being disposed between the base and the platform and having a first end coupled to the base and an opposed second end coupled to the platform;
   the linkage assembly further comprising a synchronizing strut pivotally connected at a first end to an end of a first scissor arm of at least one of the first laterally spaced apart pair of scissor arms wherein the end of the first scissor arm that is pivotally connected to the first end of the synchronizing strut is slidable relative to the base or platform, and the synchronizing strut being pivotally connected at a second end to an end of a corresponding first scissor arm of at least one of the second laterally spaced apart pair of scissor arms wherein the end of the corresponding first scissor arm that is pivotally connected to the second end of the synchronizing strut also is slidable relative to the base or platform, and wherein the synchronizing strut extends horizontally and maintains a horizontal orientation during synchronized movement of the at least two laterally spaced apart pairs of scissor arms;
   a lift mechanism having a single lift cylinder that is coupled to and disposed between the base and the platform;
   an upwardly extending handle;
   wherein the platform is movable between a first position and a second position that is above the first position; and
   wherein the at least two laterally spaced apart pairs of scissor arms of the linkage assembly are vertically extendible and stabilize the platform above the base when the platform is moved between the first and second positions, and wherein the first end of each scissor arm at all times remains at a constant height relative to the base while the opposed second end of each scissor arm moves vertically relative to the base with the platform when the platform is moved between the first and second positions.

2. The cart of claim 1, wherein the plurality of wheels includes at least two wheels that are rotatably coupled to the base on axles that extend perpendicularly to a longitudinal axis of the cart and at least two wheels that are rotatably coupled to the base on axles that are mounted on caster assemblies that swivel about a vertical axis.

3. The cart of claim 2, wherein the at least two wheels that are rotatably coupled to the base on axles that extend perpendicularly to the longitudinal axis of the cart have a larger diameter than the at least two wheels that are rotatably coupled to the base on axles that are mounted on caster assemblies.

4. The cart of claim 2, wherein the at least two wheels that are rotatably coupled to the base on axles that extend perpendicularly to the longitudinal axis of the cart are disposed along the sides of the base forward of the at least two wheels that are rotatably coupled to the base on axles that are mounted on caster assemblies.

5. The cart of claim 2, wherein the caster assemblies that swivel about a vertical axis include a resilient element.

6. The cart of claim 2, further comprising two drive motors and wherein two wheels that are rotatably coupled to the base on axles that extend perpendicularly to the longitudinal axis of the cart are separately coupled to the respective two drive motors.

7. The cart of claim 6, further comprising a controller being electrically coupled to the two drive motors and being configured to vary the rotational speeds of the two drive motors.

8. The cart of claim 1, wherein the single lift cylinder further comprises a hydraulic cylinder.

9. The cart of claim 8, wherein the lift mechanism further comprises a pump fluidly coupled to the hydraulic cylinder.

10. The cart of claim 9, further comprising a lift controller being electrically coupled to the pump.

11. The cart of claim 9, wherein the pump is coupled to the base.

12. The cart of claim 9, wherein pump is coupled to the upwardly extending handle.

13. The cart of claim 1, wherein at least one of the plurality of wheels is coupled to a drive motor.

14. The cart of claim 13, further comprising a drive controller being electrically coupled to the drive motor.

15. A cart having an adjustable height platform and a drive system, comprising:
a base;
a plurality of wheels rotatably coupled to the base;
a platform located directly above the base;
a drive motor extending horizontally within the base and being located directly below the platform;
at least one of the plurality of wheels being centrally located along a length of the base and being coupled to the drive motor;
a drive controller being electrically coupled to the drive motor;
a vertically extendible linkage assembly further comprising a plurality of scissor arms coupled to and disposed between the base and the platform, wherein each scissor arm has a first end coupled to the base and an opposed second end coupled to the platform;
a lift mechanism coupled to and disposed between the base and the platform;
an upwardly extending handle;
the platform being movable between a first position and a second position that is above the first position; and
wherein the linkage assembly stabilizes the platform above the base when the platform is moved between the first and second positions, and the first end of each scissor arm at all times remains at a constant height relative to the base while the opposed second end of each scissor arm moves vertically relative to the base with the platform when the platform is moved between the first and second positions.

16. The cart of claim 15, wherein the lift mechanism further comprises a hydraulic cylinder.

17. The cart of claim 16, wherein the lift mechanism further comprises a pump fluidly coupled to the hydraulic cylinder.

18. The cart of claim 17, further comprising a lift controller being electrically coupled to the pump.

19. The cart of claim 15, wherein the linkage assembly coupled to and disposed between the base and the platform includes at least two laterally spaced pairs of scissor arms coupled to and disposed between the base and the platform.

20. The cart of claim 15, further comprising a second drive motor and wherein at least a second of the plurality of wheels is centrally located along the length of the base and is coupled to the second drive motor.

21. The cart of claim 20, wherein the drive controller is electrically coupled to the two drive motors and is configured to vary the rotational speeds of the two drive motors.

22. The cart of claim 15, wherein the plurality of wheels includes at least two wheels that are rotatably coupled to the base on axles that extend perpendicularly to the longitudinal axis of the cart and at least two wheels that are rotatably coupled to the base on axles that are mounted on caster assemblies that swivel about a vertical axis.

* * * * *